(12) United States Patent
Balasubramanian et al.

(10) Patent No.: US 12,487,841 B2
(45) Date of Patent: Dec. 2, 2025

(54) REAL-TIME DYNAMIC CONTAINER OPTIMIZATION COMPUTING PLATFORM

(71) Applicant: Bank of America Corporation, Charlotte, NC (US)

(72) Inventors: Prabhakaran Balasubramanian, Tamilnadu (IN); Medapati Venkat Kishore Reddy, Telangana (IN); Suriyanath S, Tamilnadu (IN)

(73) Assignee: Bank of America Corporation, Charlotte, NC (US)

( * ) Notice: Subject to any disclaimer, the term of this patent is extended or adjusted under 35 U.S.C. 154(b) by 728 days.

(21) Appl. No.: 17/368,299

(22) Filed: Jul. 6, 2021

(65) Prior Publication Data
US 2023/0007856 A1    Jan. 12, 2023

(51) Int. Cl.
*G06F 9/455* (2018.01)
*G06F 11/34* (2006.01)
*G06N 20/00* (2019.01)

(52) U.S. Cl.
CPC ...... *G06F 9/45558* (2013.01); *G06F 11/3495* (2013.01); *G06N 20/00* (2019.01); *G06F 2009/45575* (2013.01); *G06F 2009/45591* (2013.01)

(58) Field of Classification Search
CPC ....... G06F 9/45558; G06F 2009/45575; G06F 2009/45591; G06F 11/3495; G06N 20/00
See application file for complete search history.

(56) References Cited

U.S. PATENT DOCUMENTS

| | | | |
|---|---|---|---|
| 8,407,190 B2 | 3/2013 | Prahlad et al. | |
| 9,251,483 B2 | 2/2016 | Gebhart et al. | |
| 9,626,224 B2 | 4/2017 | Hughes et al. | |
| 9,936,047 B2 | 4/2018 | Adolph et al. | |
| 10,129,046 B1 * | 11/2018 | Casilli | H04L 12/2809 |
| 10,375,169 B1 * | 8/2019 | Diallo | G06F 11/301 |
| 10,404,579 B1 * | 9/2019 | Biemueller | H04L 41/0803 |
| 10,419,530 B2 | 9/2019 | Halpern et al. | |
| 11,418,459 B1 * | 8/2022 | Shateri | H04L 43/0876 |
| 11,455,168 B1 * | 9/2022 | Potyraj | G06F 9/3005 |

(Continued)

FOREIGN PATENT DOCUMENTS

WO    WO-2011124938 A1 * 10/2011    ........... H04L 41/147

*Primary Examiner* — April Y Blair
*Assistant Examiner* — Zhi Chen
(74) *Attorney, Agent, or Firm* — Banner & Witcoff, Ltd.

(57) ABSTRACT

Aspects of the disclosure relate to a real-time dynamic container optimization computing platform. The real-time dynamic container optimization computing platform may receive a request to create a first processing block and first data associated with the first processing block. The real-time dynamic container optimization computing platform may utilize a plurality of models to select a first computing device for the first processing block. The real-time dynamic container optimization computing platform may generate and deploy a container to the first computing device. The real-time dynamic container optimization computing platform may monitor execution of the container on the first computing device. The real-time dynamic container optimization computing platform may migrate the container to the second computing device if an issue with execution of the container on the first computing device is detected.

20 Claims, 23 Drawing Sheets

(56) References Cited

U.S. PATENT DOCUMENTS

| | | | |
|---|---|---|---|
| 2009/0327781 A1* | 12/2009 | Tripathi | G06F 9/5077 713/300 |
| 2011/0154320 A1* | 6/2011 | Verma | H04W 4/60 718/1 |
| 2015/0163192 A1* | 6/2015 | Jain | H04L 61/103 370/255 |
| 2016/0321097 A1* | 11/2016 | Zhu | G06F 9/45558 |
| 2017/0005923 A1 | 1/2017 | Babakian | |
| 2017/0063722 A1 | 3/2017 | Cropper et al. | |
| 2017/0078198 A1* | 3/2017 | Nellikar | H04L 43/08 |
| 2019/0005576 A1 | 1/2019 | Mick et al. | |
| 2019/0220755 A1* | 7/2019 | Carbune | G06N 20/00 |
| 2019/0245757 A1* | 8/2019 | Meyer | H04L 41/5051 |
| 2020/0195663 A1* | 6/2020 | Achituve | G06N 3/126 |
| 2021/0097449 A1* | 4/2021 | Chattopadhyay | G06N 20/20 |
| 2021/0373965 A1* | 12/2021 | Hadas | G06F 9/45558 |
| 2022/0413941 A1* | 12/2022 | Ramtekkar | G06F 9/5022 |
| 2023/0325258 A1* | 10/2023 | Wang | H04L 43/0817 718/105 |

* cited by examiner

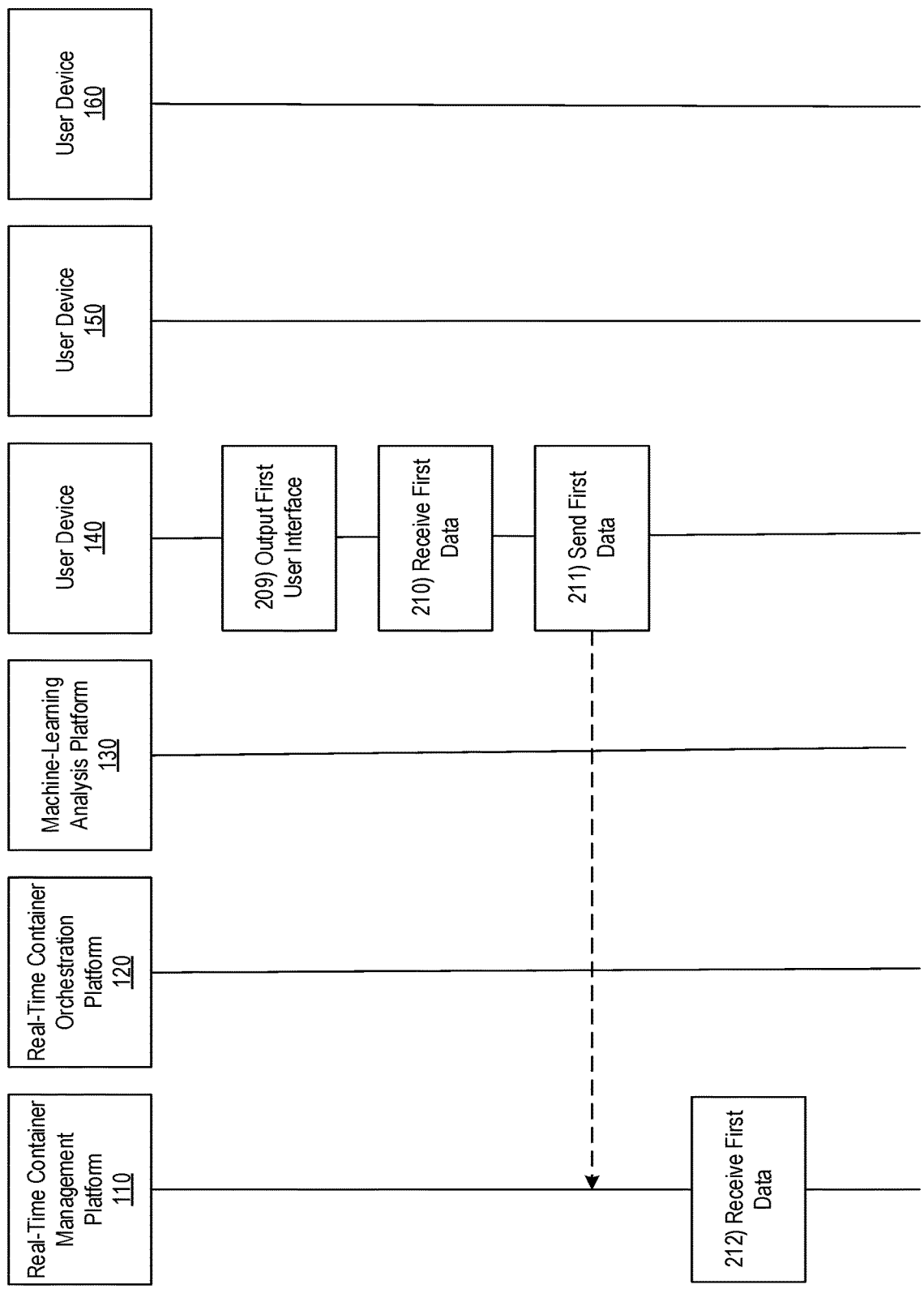

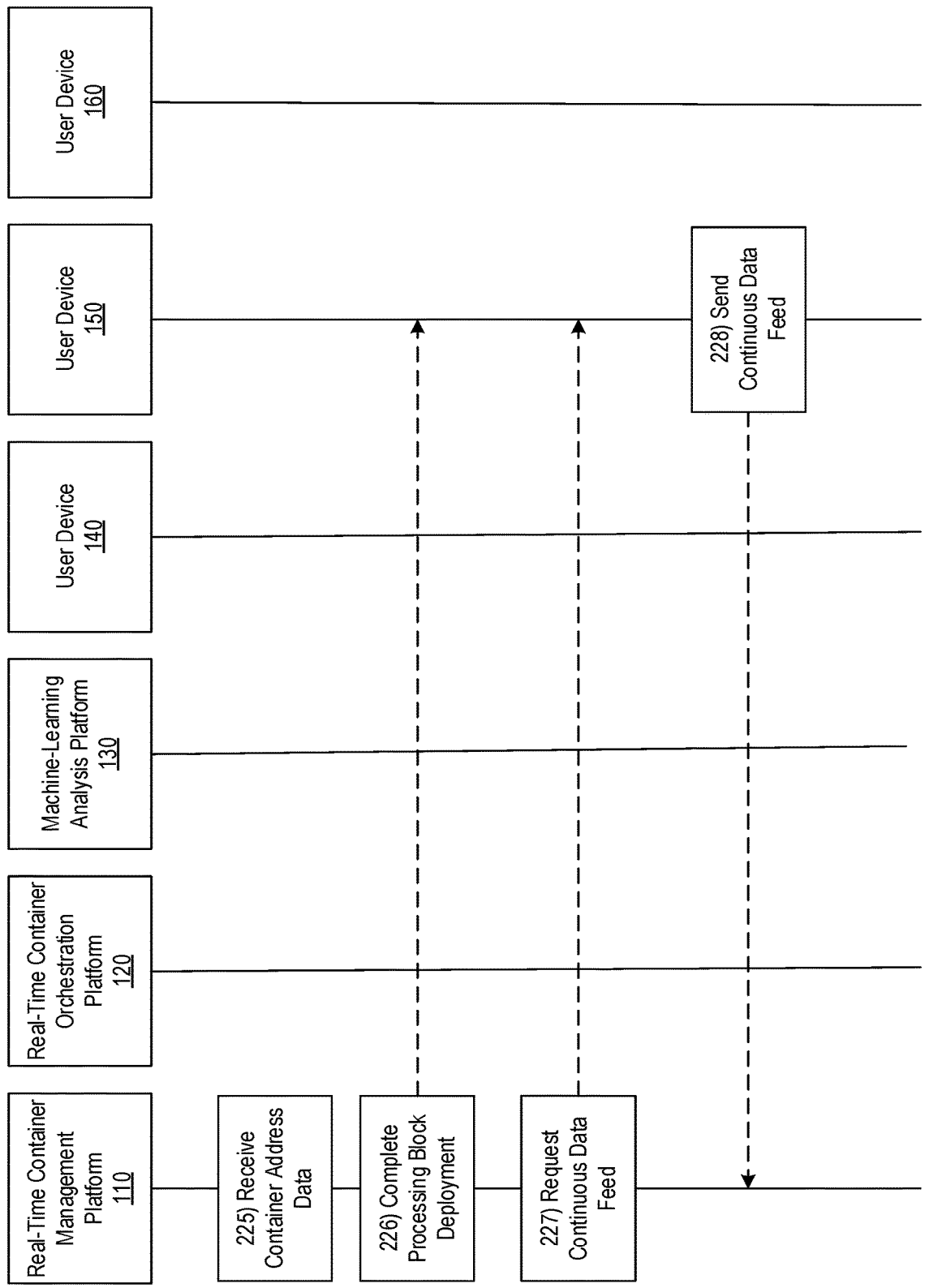

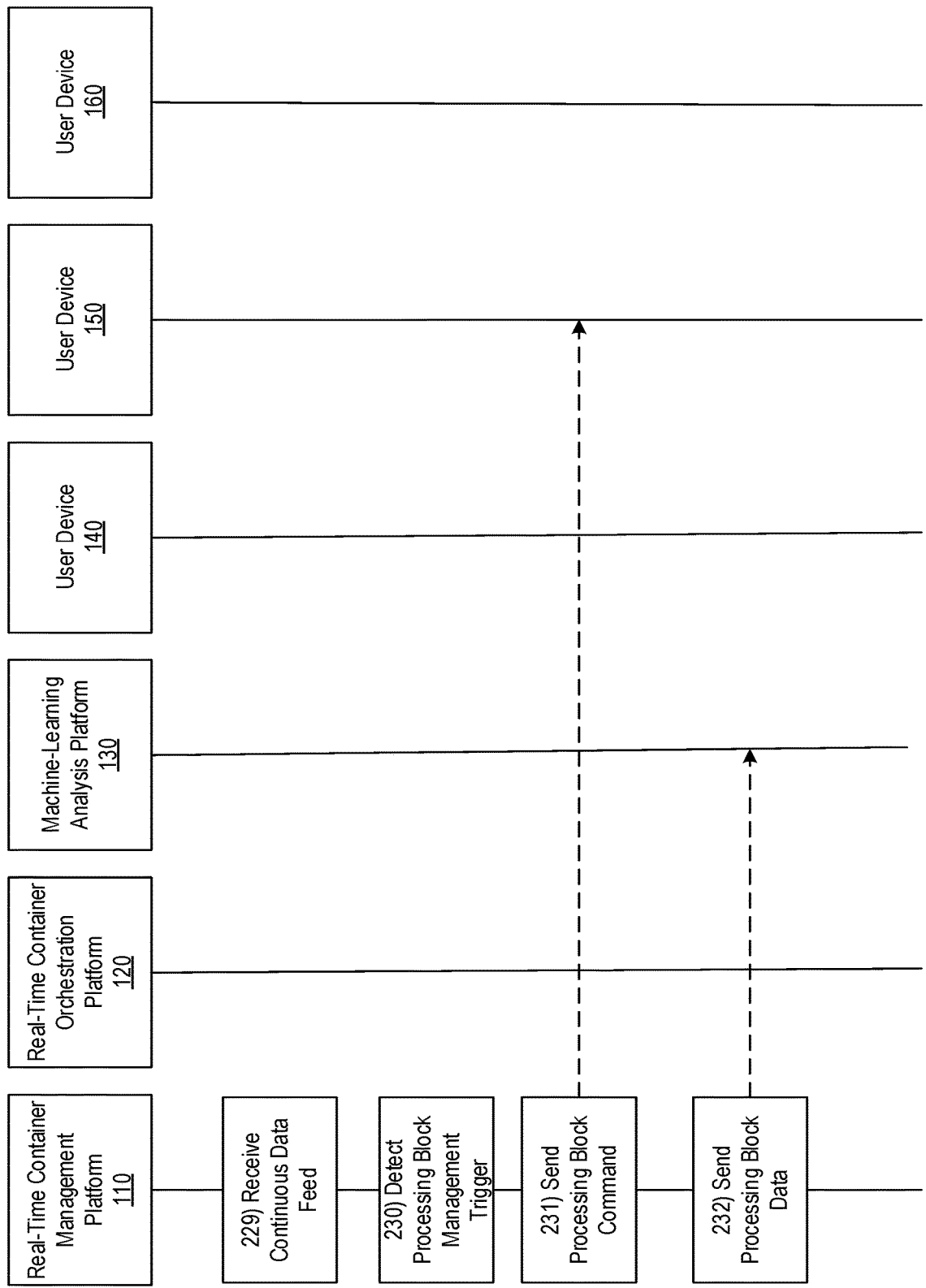

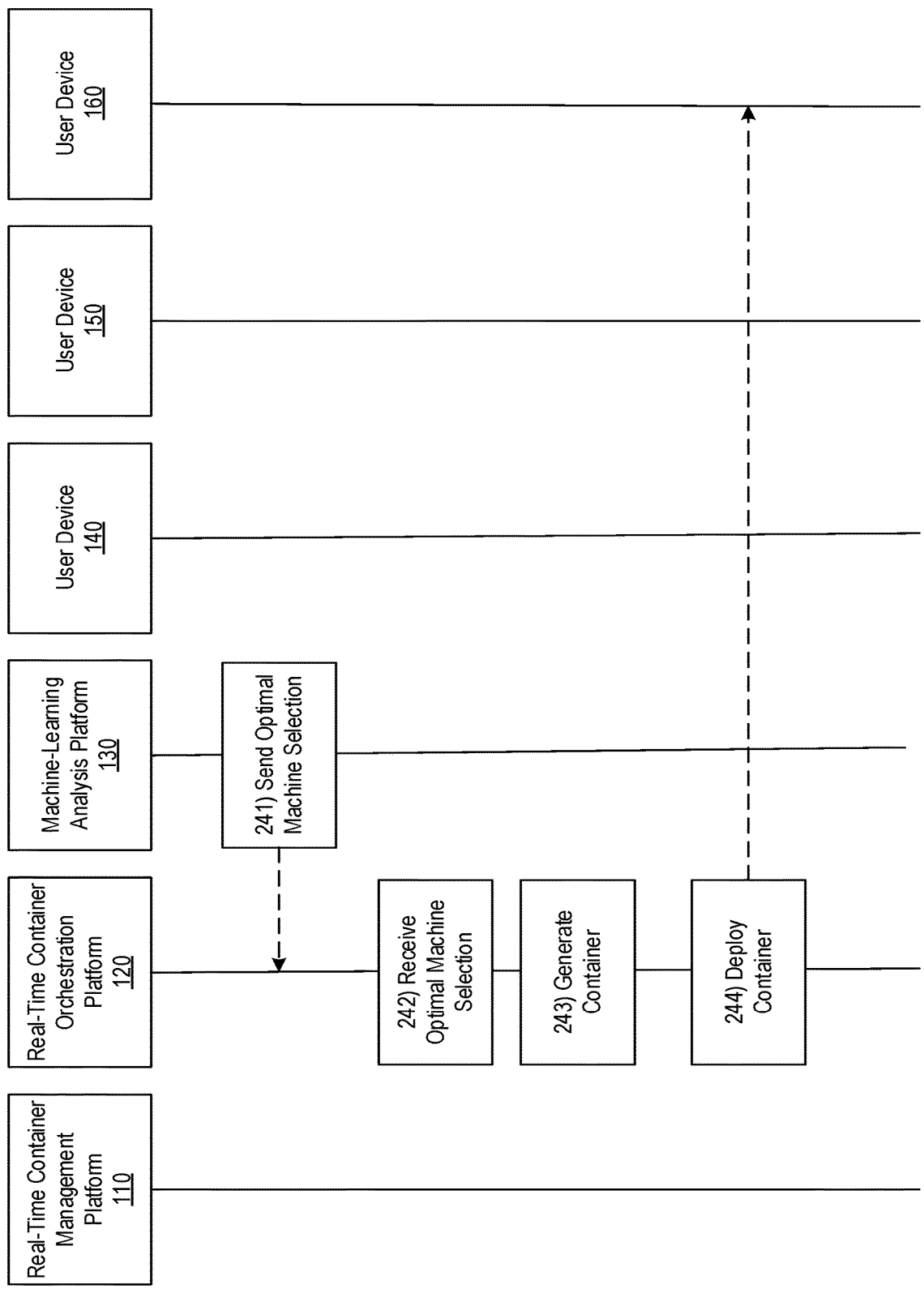

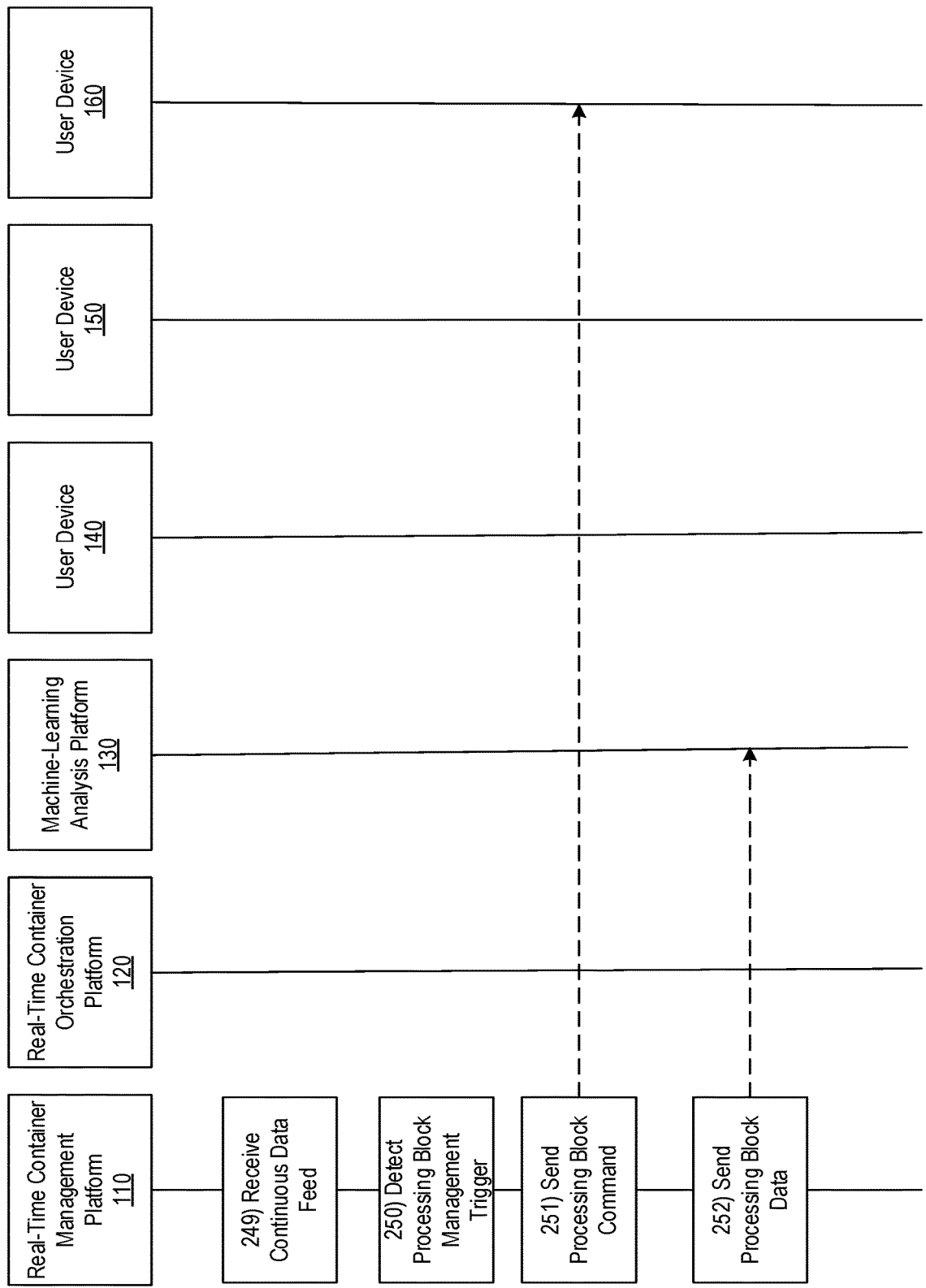

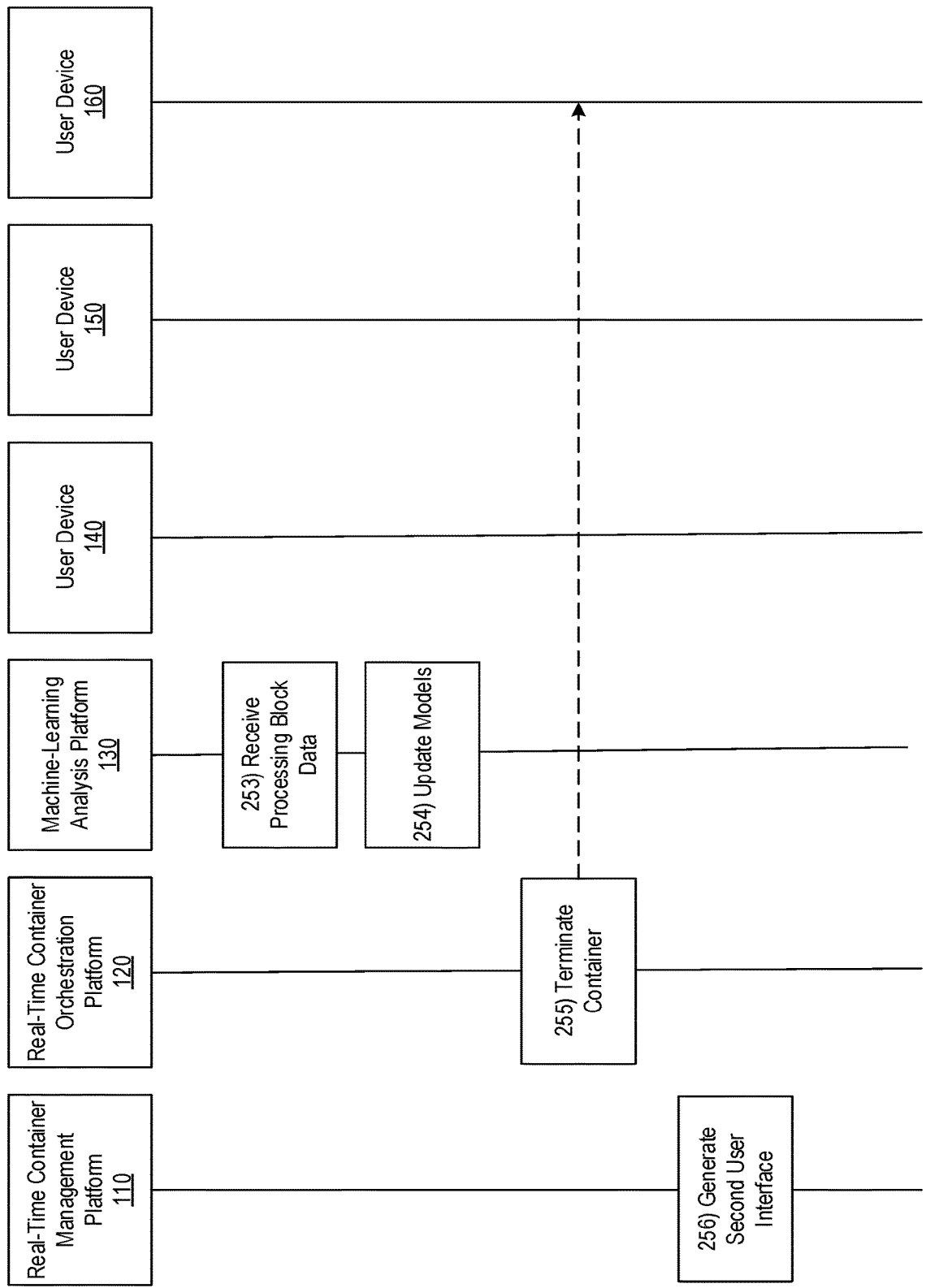

REAL-TIME DYNAMIC CONTAINER OPTIMIZATION COMPUTING PLATFORM

BACKGROUND

Aspects of the disclosure relate to a real-time dynamic container optimization computing platform. In particular, one or more aspects of the disclosure relate to dynamic generation and deployment of containers based on technical requirements and real-time monitoring and modification of those containers based on performance data.

In some cases, enterprise organizations may comprise hundreds or thousands of individuals, teams, units, or entities that are provided with individual enterprise-associated computing devices. Enterprise organizations may also provide separate enterprise-associated computing servers that, while commonly used to run large-scale software systems, are often associated with higher costs. This leads to underutilization of the enterprise-associated computing devices and overutilization of the more-expensive enterprise-associated computing servers. This is especially true during times when the enterprise-associated computing devices are underutilized (i.e., used for performing tasks that are not computationally intensive) or sitting idle (i.e., overnight or the weekends).

SUMMARY

Aspects of the disclosure provide effective, efficient, scalable, and convenient technical solutions that address and overcome the technical problems associated with conventional container-based systems. In accordance with one or more embodiments, a real-time container management platform comprising a first processor, a communication interface, and memory storing computer-readable instructions may receive, from a user device, a first request to create a processing block. The real-time container management platform may generate, based on the first request to create the processing block, a first graphical user interface. The real-time container management platform may send, to the user device, the first graphical user interface, wherein sending the first graphical user interface to the user device is configured to cause the user device to output the first graphical user interface for display to a display device of the user device. The real-time container management platform may receive, from the user device, first data. The real-time container management platform may generate, based on the first data, a second request for the processing block. The real-time container management platform may send, to a real-time container orchestration platform, the second request.

In accordance with one or more embodiments of the disclosure, the real-time container orchestration platform comprising at least one processor, a communication interface, and memory storing computer-readable instructions may generate, based on the second request, a first optimal machine selection request. The real-time container orchestration platform may send, to a machine-learning analysis platform, the first optimal machine selection request. The real-time container orchestration platform may generate, based on the first request, a container. The real-time container orchestration platform may deploy the container to the first selected optimal machine.

In accordance with one or more embodiments of the disclosure, the machine-learning analysis platform comprising at least one processor, a communication interface, and memory storing computer-readable instructions may select the first selected optimal machine based on a plurality of cumulative models, wherein each cumulative model of the plurality of cumulative models is associated with a different computing system.

In one or more instances, the real-time container management platform may request, from the first selected optimal machine, container performance data. The real-time container management platform may receive, from the first selected optimal machine, the container performance data.

In one or more instances, the container performance data may be sent from the first selected optimal machine to the real-time container management platform in real-time. In one or more instances, the container performance data may be sent from the first selected optimal machine to the real-time container management platform at predefined intervals.

In one or more instances, the real-time container management platform may detect, within the container performance data, a first processing block management trigger. The real-time container management platform may send, to the machine-learning analysis platform and based on the first processing block management trigger, processing block data comprising the first processing block management trigger.

In one or more instances, a first cumulative model of the cumulative models may be associated with a first computing device. The first cumulative model may comprise a historical model comprising static data associated with the first computing device and a machine-learning model comprising dynamic data associated with the first computing device. The machine-learning analysis platform may receive, from the first computing device, utilization data for the first computing device. The machine-learning analysis platform may update the first cumulative model based on the utilization data. The utilization data may be sent from the first computing device to the machine-learning analysis platform in real-time or at predefined time intervals.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to a real-time dynamic container optimization computing platform. To improve the efficient use of under-utilized enterprise-associated computing devices, an enterprise may implement a real-time dynamic container optimization computing platform. The real-time dynamic container optimization computing platform may monitor the real-time availability of computational resources of those enterprise-associated computing devices. The real-time dynamic container optimization computing platform may utilize one or more models to predict when computational resources of those enterprise-associated computing devices will be available in the future. The real-time dynamic container optimization computing platform may deploy containers on computationally available enterprise-associated computing devices based on model outputs.

Figure 1A:
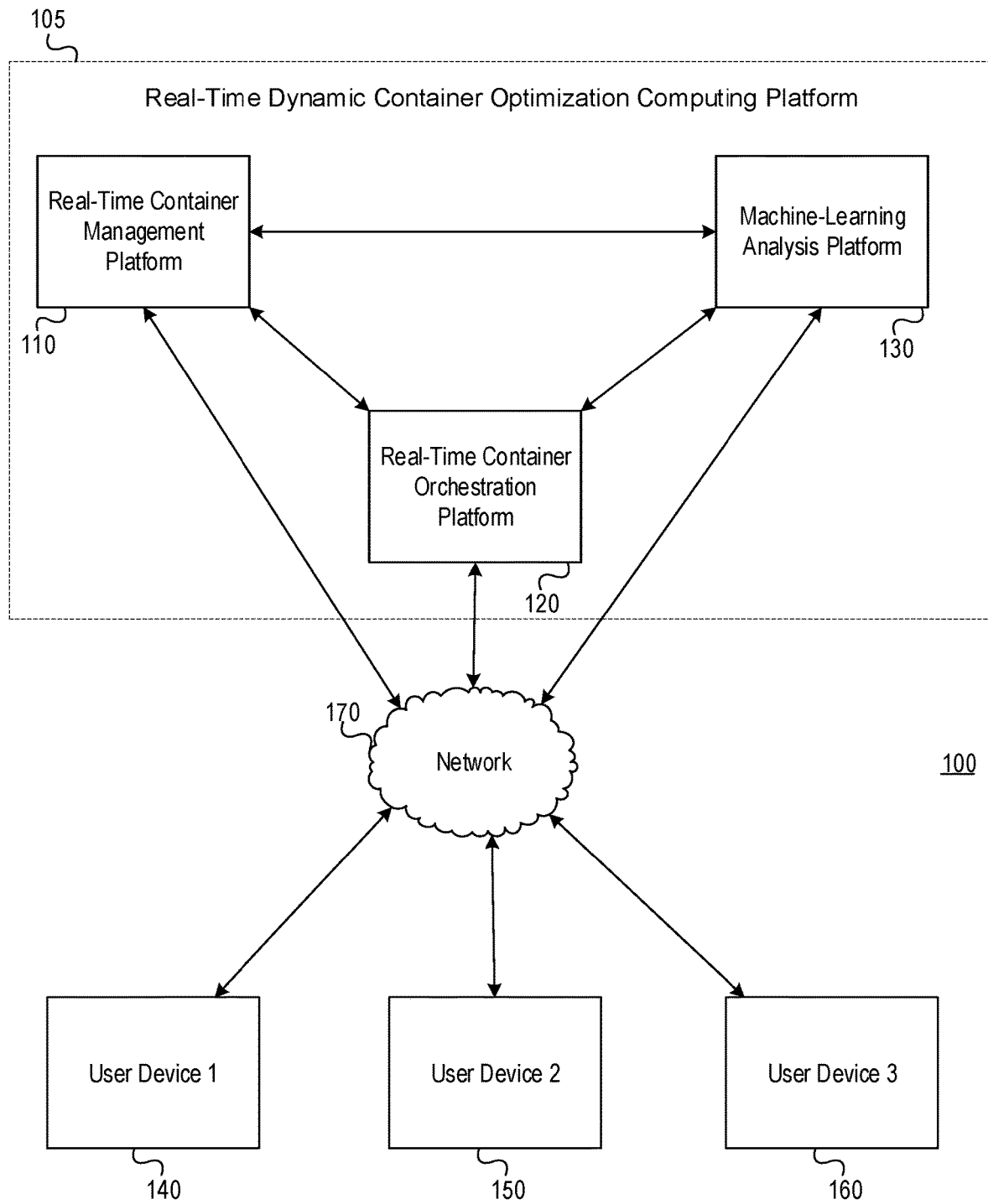
FIGS. 1A-1D depict an illustrative computing environment for implementing a real-time dynamic container optimization computing platform in accordance with one or more example embodiments.

FIGS. 1A-1D depict an illustrative computing environment that implements a real-time dynamic container optimization computing platform in accordance with one or more example embodiments. Referring to FIG. 1A, computing environment 100 may include one or more computer systems. For example, computing environment 100 may include real-time dynamic container optimization computing platform 105 that includes real-time container management platform 110, real-time container orchestration platform 120, and machine-learning analysis platform 130. Computing environment 100 may additionally include user device 140, user device 150, and/or user device 160. Although real-time dynamic container optimization computing platform 105 is depicted as being implemented on three computer systems (real-time container management platform 110, real-time container orchestration platform 120, and machine-learning analysis platform 130), real-time dynamic container optimization computing platform 105 may, in some arrangements, be implemented using one computer system (that is, one computer system that implements the below-described functionality of all of real-time container management platform 110, real-time container orchestration platform 120, and machine-learning analysis platform 130), or alternatively, using two computer systems or more than three computer systems (that is, four or more computer systems that collectively implement the below-described functionality of real-time container management platform 110, real-time container orchestration platform 120, and machine-learning analysis platform 130). Although only one instance is shown for each of real-time container management platform 110, real-time container orchestration platform 120, and machine-learning analysis platform 130, real-time dynamic container optimization computing platform 105 may, in some, include multiple instances of one or more of real-time container management platform 110, real-time container orchestration platform 120, or machine-learning analysis platform 130. For example, real-time dynamic container optimization computing platform 105 may include a separate instance of machine-learning analysis platform 130 for each of user device 140, user device 150, and user device 160. Each separate instance of machine-learning analysis platform 130 may include the below-discussed architecture and functionality of machine-learning analysis platform 130.

As described further below, real-time container management platform 110 may be a computer system that includes one or more computing devices (e.g., servers, server blades, or the like) and/or other computer components (e.g., processors, memories, communication interfaces) that may be used to inspect and secure one or more events prior to authorizing the execution of those events. In some, real-time container management platform 110 may be controlled or otherwise maintained by an enterprise organization such as a financial institution.

Similarly, real-time container orchestration platform 120 may be a computer system that includes one or more computing devices (e.g., servers, server blades, or the like) and/or other computer components (e.g., processors, memories, communication interfaces) that may be used to analyze one or more events using a neural network model and a decision engine. In some, real-time container orchestration platform 120 may be controlled or otherwise maintained by an enterprise organization such as a financial institution.

Similarly, machine-learning analysis platform 130 may be a computer system that includes one or more computing devices (e.g., servers, server blades, or the like) and/or other computer components (e.g., processors, memories, communication interfaces) that may be used to analyze one or more events using a neural network model and a decision engine. In some, machine-learning analysis platform 130 may be controlled or otherwise maintained by an enterprise organization such as a financial institution.

User device 140 may be a computer system that includes one or more computing devices (e.g., servers, server blades, laptop computers, desktop computers, mobile devices, tablets, smartphones, credit card readers, or the like) and/or other computer components (e.g., processors, memories, communication interfaces) that may be used to perform enterprise operations and/or container execution. In one or more instances, user device 140 may be configured to communicate with real-time dynamic container optimization computing platform 105 (via real-time container management platform 110, real-time container orchestration platform 120, and machine-learning analysis platform 130) for container execution. User device 150 and user device 160 may be user devices similar to user device 140.

Computing environment 100 also may include one or more networks, which may interconnect real-time dynamic container optimization computing platform 105 (e.g., real-time container management platform 110, real-time container orchestration platform 120, and machine-learning analysis platform 130), user device 140, user device 150, and/or user device 160. For example, computing environment 100 may include a network 170 (which may interconnect, e.g., real-time dynamic container optimization computing platform 105 (e.g., real-time container management platform 110, real-time container orchestration platform 120, and machine-learning analysis platform 130), user device 140, user device 150, and/or user device 160).

In one or more arrangements, real-time dynamic container optimization computing platform 105 (e.g., real-time container management platform 110, real-time container orchestration platform 120, and machine-learning analysis platform 130), user device 140, user device 150, and/or user device 160, may be any type of computing device capable of sending and/or receiving requests and processing the requests accordingly. For example, real-time dynamic container optimization computing platform 105 (e.g., real-time container management platform 110, real-time container orchestration platform 120, and machine-learning analysis platform 130), user device 140, user device 150, user device 160, and/or the other systems included in computing environment 100 may, in some, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of real-time dynamic container optimization computing platform 105 (e.g., real-time container management platform 110, real-time container orchestration platform 120, and machine-learning analysis platform 130), user device 140, user device 150, and/or user device 160, may, in some, be special-purpose computing devices configured to perform specific functions.

Figure 1B:
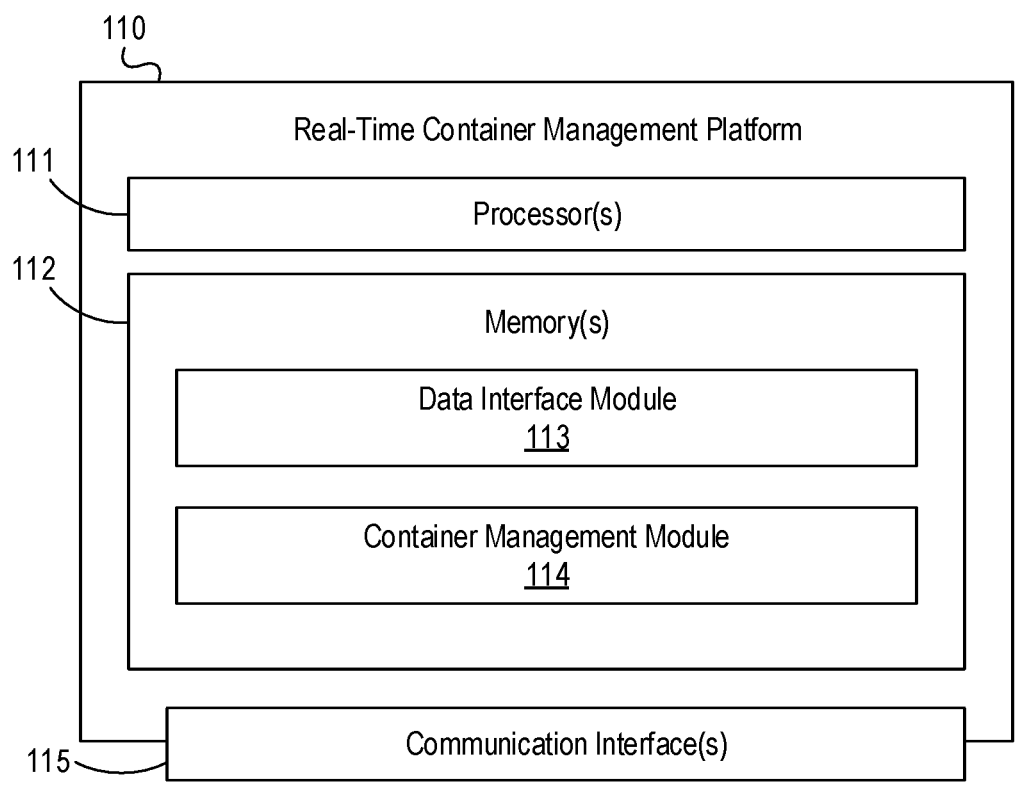

Referring to FIG. 1B, real-time container management platform 110 may include one or more processors 111, memory 112, and communication interface 115. A data bus may interconnect processor 111, memory 112, and communication interface 115. Communication interface 115 may be a network interface configured to support communication between real-time container management platform 110 and one or more networks (e.g., network 170, or the like). Memory 112 may include one or more program modules having instructions that when executed by processor 111 cause real-time container management platform 110 to perform one or more functions described herein and/or one or more databases that may store and/or otherwise maintain information which may be used by such program modules and/or processor 111. In some, the one or more program modules and/or databases may be stored by and/or maintained in different memory units of real-time container management platform 110 and/or by different computing devices that may form and/or otherwise make up real-time container management platform 110. For example, memory 112 may have, host, store, and/or include data interface module 113 and/or container management module 114.

Data interface module 113 may have instructions that direct and/or cause real-time container management platform 110 to receive input data from any of the computer systems shown in FIG. 1A (i.e., real-time container orchestration platform 120, machine-learning analysis platform 130, user device 140, user device 150, and/or user device 160) and/or to send output data to any of the computer systems shown in FIG. 1A (i.e., real-time container orchestration platform 120, machine-learning analysis platform 130, user device 140, user device 150, and/or user device 160). Container management module 114 may have instructions that direct and/or cause real-time container management platform 110 to request the deployment of one or more containers, monitor the execution of one or more containers, and/or manage the execution of one or more containers.

Figure 1C:
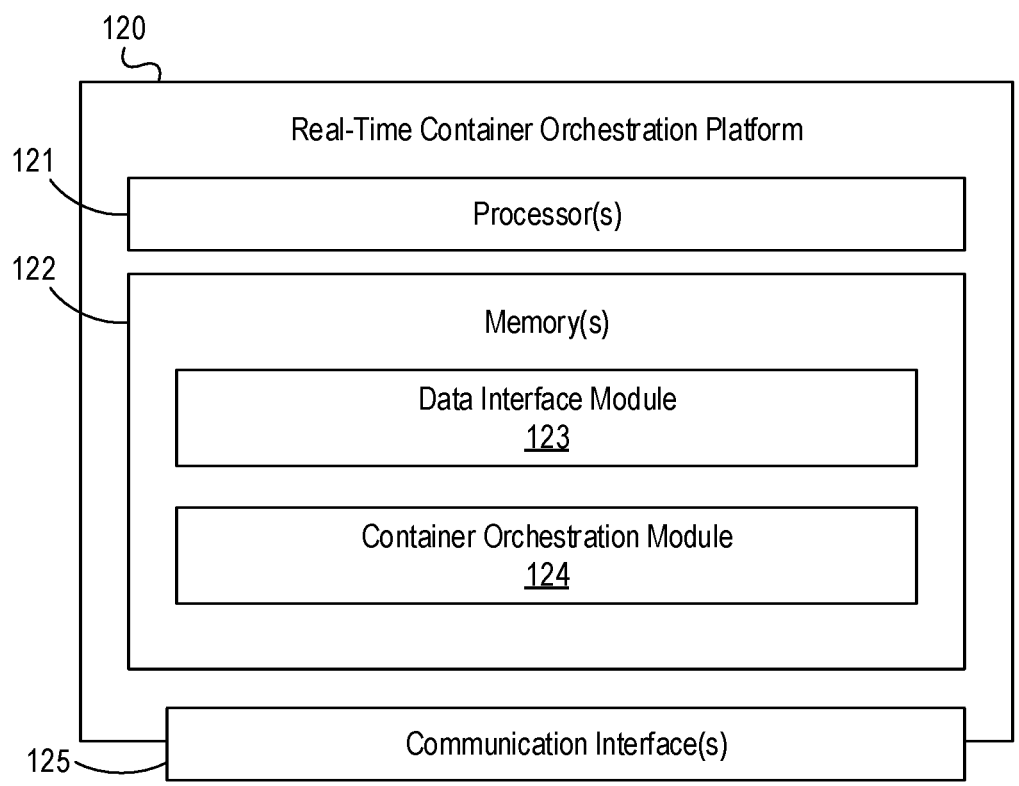

Referring to FIG. 1C, real-time container orchestration platform 120 may include one or more processors 121, memory 122, and communication interface 125. A data bus may interconnect processor 121, memory 122, and communication interface 125. Communication interface 125 may be a network interface configured to support communication between real-time container orchestration platform 120 and one or more networks (e.g., network 170, or the like). Memory 122 may include one or more program modules having instructions that when executed by processor 121 cause real-time container orchestration platform 120 to perform one or more functions described herein and/or one or more databases that may store and/or otherwise maintain information which may be used by such program modules and/or processor 121. In some, the one or more program modules and/or databases may be stored by and/or maintained in different memory units of real-time container orchestration platform 120 and/or by different computing devices that may form and/or otherwise make up real-time container orchestration platform 120. For example, memory 122 may have, host, store, and/or include data interface module 123 and container orchestration module 124.

Data interface module 123 may have instructions that direct and/or cause real-time container orchestration platform 120 to receive input data from any of the computer systems shown in FIG. 1A (i.e., real-time container management platform 110, machine-learning analysis platform 130, user device 140, user device 150, and/or user device 160) and/or to send output data to any of the computer systems shown in FIG. 1A (i.e., real-time container management platform 110, machine-learning analysis platform 130, user device 140, user device 150, and/or user device 160). Container orchestration module 124 may have instructions that direct and/or cause real-time container orchestration platform 120 to generate and deploy containers, migrate containers, stop/pause the execution of containers, and/or otherwise orchestrate the execution of containers.

Figure 1D:
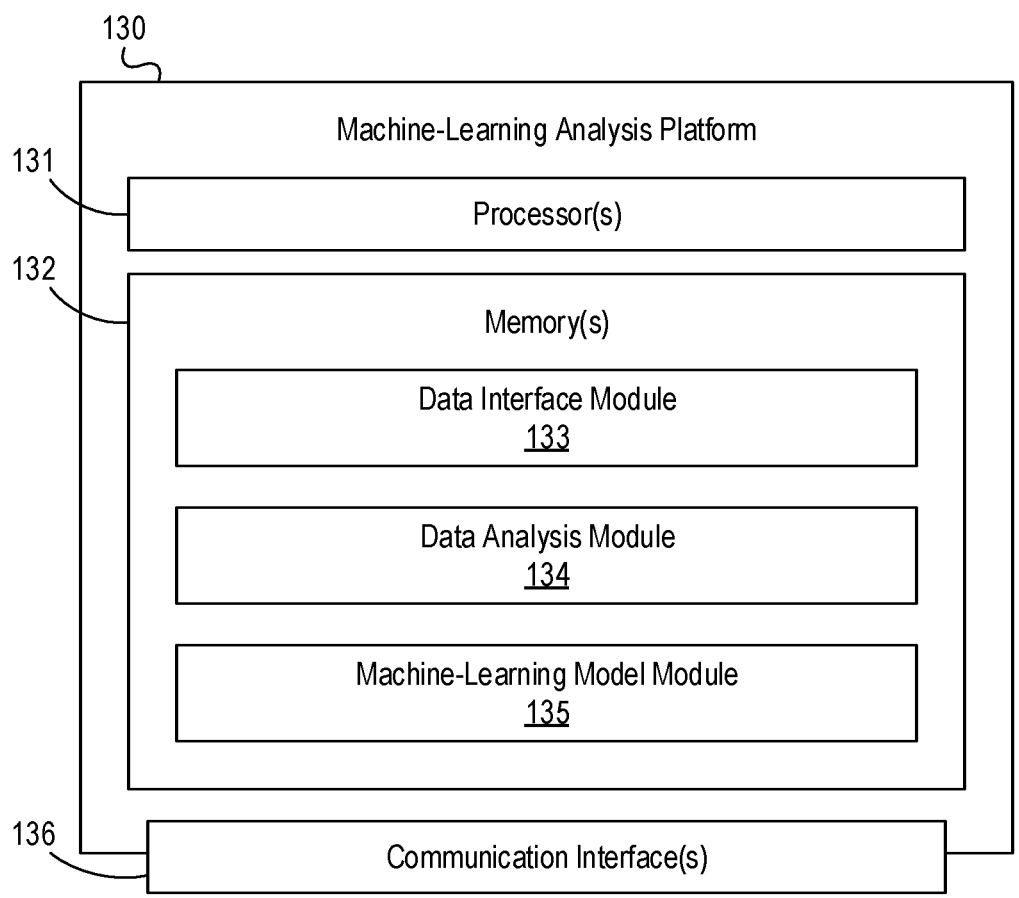

Referring to FIG. 1D, machine-learning analysis platform 130 may include one or more processors 131, memory 132, and communication interface 136. A data bus may interconnect processor 131, memory 132, and communication interface 136. Communication interface 136 may be a network interface configured to support communication between machine-learning analysis platform 130 and one or more networks (e.g., network 170, or the like). Memory 132 may include one or more program modules having instructions that when executed by processor 131 cause machine-learning analysis platform 130 to perform one or more functions described herein and/or one or more databases that may store and/or otherwise maintain information which may be used by such program modules and/or processor 131. In some, the one or more program modules and/or databases may be stored by and/or maintained in different memory units of machine-learning analysis platform 130 and/or by different computing devices that may form and/or otherwise make up machine-learning analysis platform 130. For example, memory 132 may have, host, store, and/or include data interface module 133, data analysis module 134, and machine-learning model module 135.

Data interface module 133 may have instructions that direct and/or cause machine-learning analysis platform 130 to receive input data from any of the computer systems shown in FIG. 1A (i.e., real-time container management platform 110, real-time container orchestration platform 120, user device 140, user device 150, and/or user device 160) and/or to send output data to any of the computer systems shown in FIG. 1A (i.e., real-time container management platform 110, real-time container orchestration platform 120, user device 140, user device 150, and/or user device 160). Data analysis module 134 may have instructions that direct and/or cause machine-learning analysis platform 130 to analyze data received from any of the computer systems shown in FIG. 1A (i.e., real-time container management platform 110, real-time container orchestration platform 120, user device 140, user device 150, and/or user device 160) and to generate data to be output to any of the computer systems shown in FIG. 1A (i.e., real-time container management platform 110, real-time container orchestration platform 120, user device 140, user device 150, and/or user device 160). Machine-learning model module 135 may have instructions that direct and/or cause machine-learning analysis platform 130 to generate, update, and/or execute one or more machine-learning models using data stored in machine-learning analysis platform 130 and/or data received from any of the computer systems shown in FIG. 1A (i.e., real-time container management platform 110, real-time container orchestration platform 120, user device 140, user device 150, and/or user device 160).

Figure 2A:
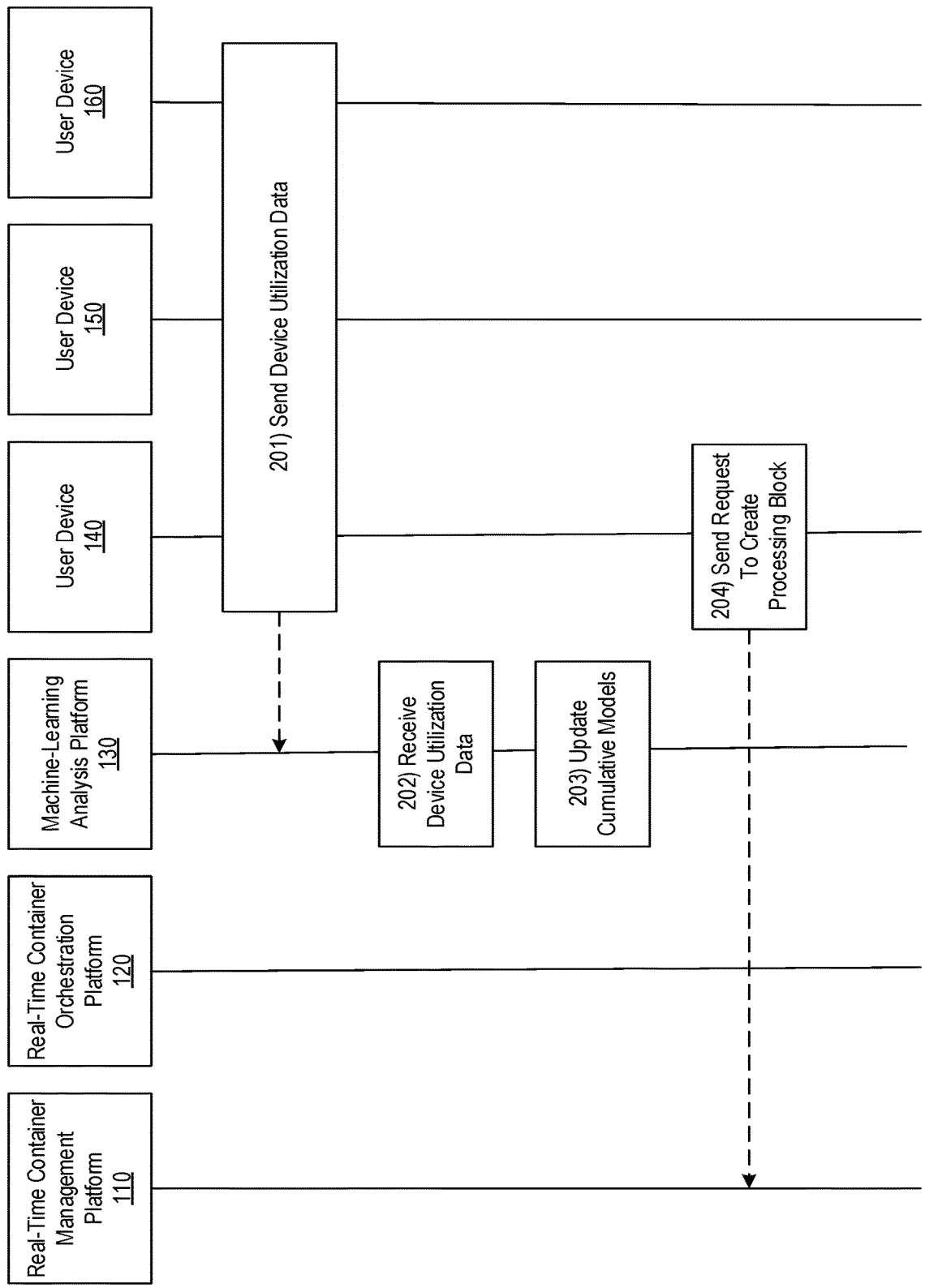
FIGS. 2A-2O depict an illustrative event sequence for implementing a real-time dynamic container optimization computing platform in accordance with one or more example embodiments.
Figure 2B:
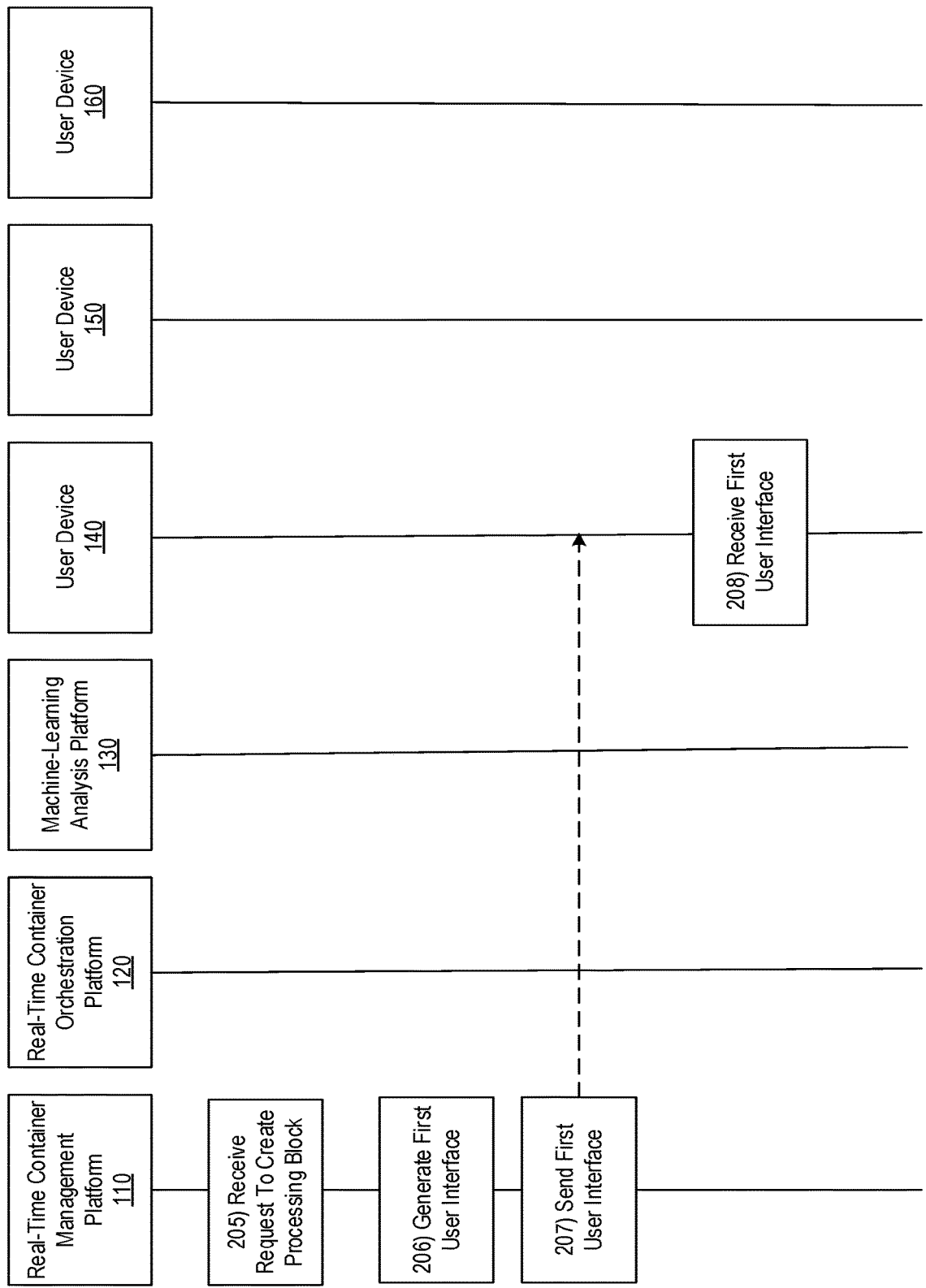
Figure 2D:
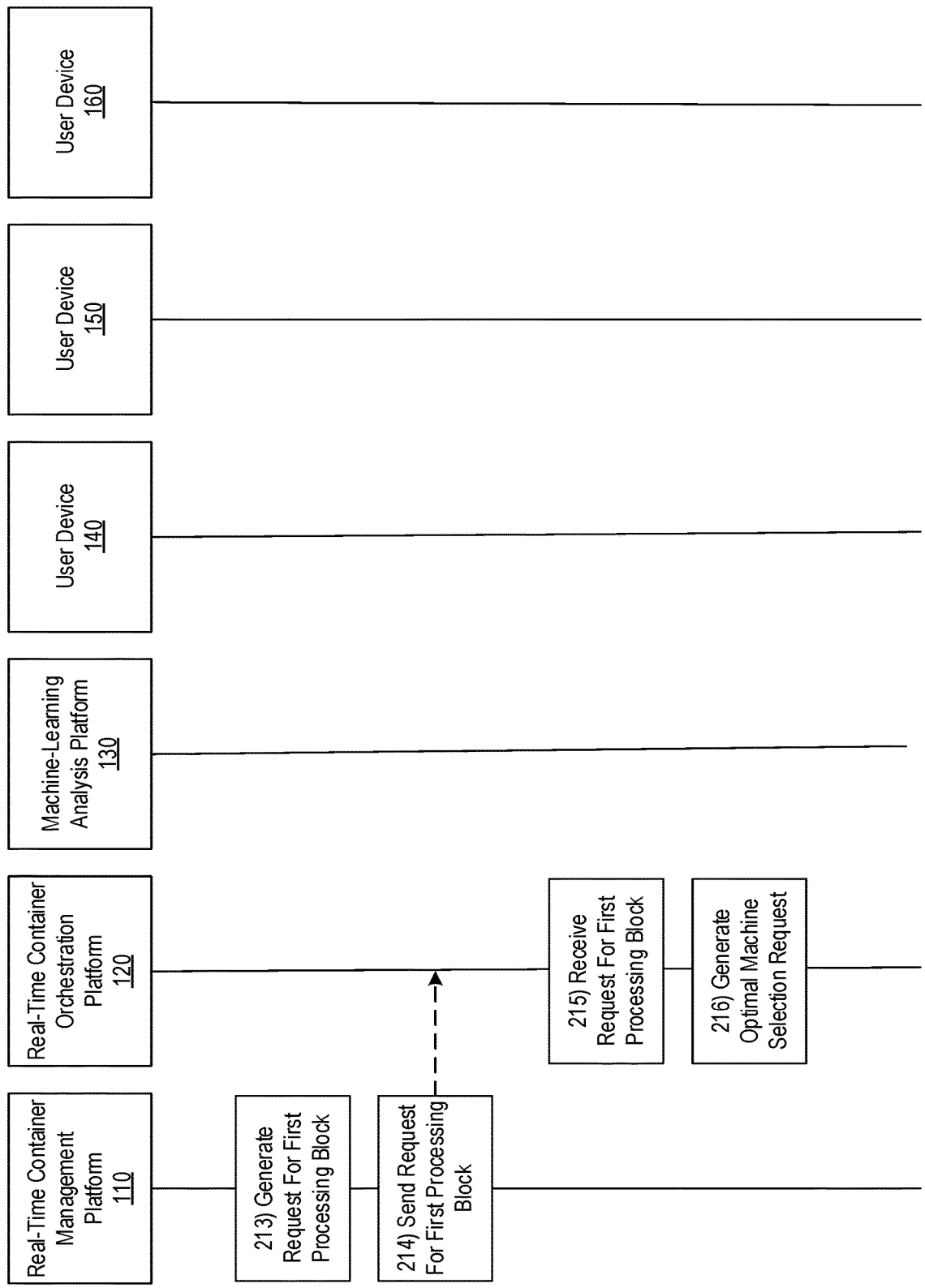
Figure 2E:
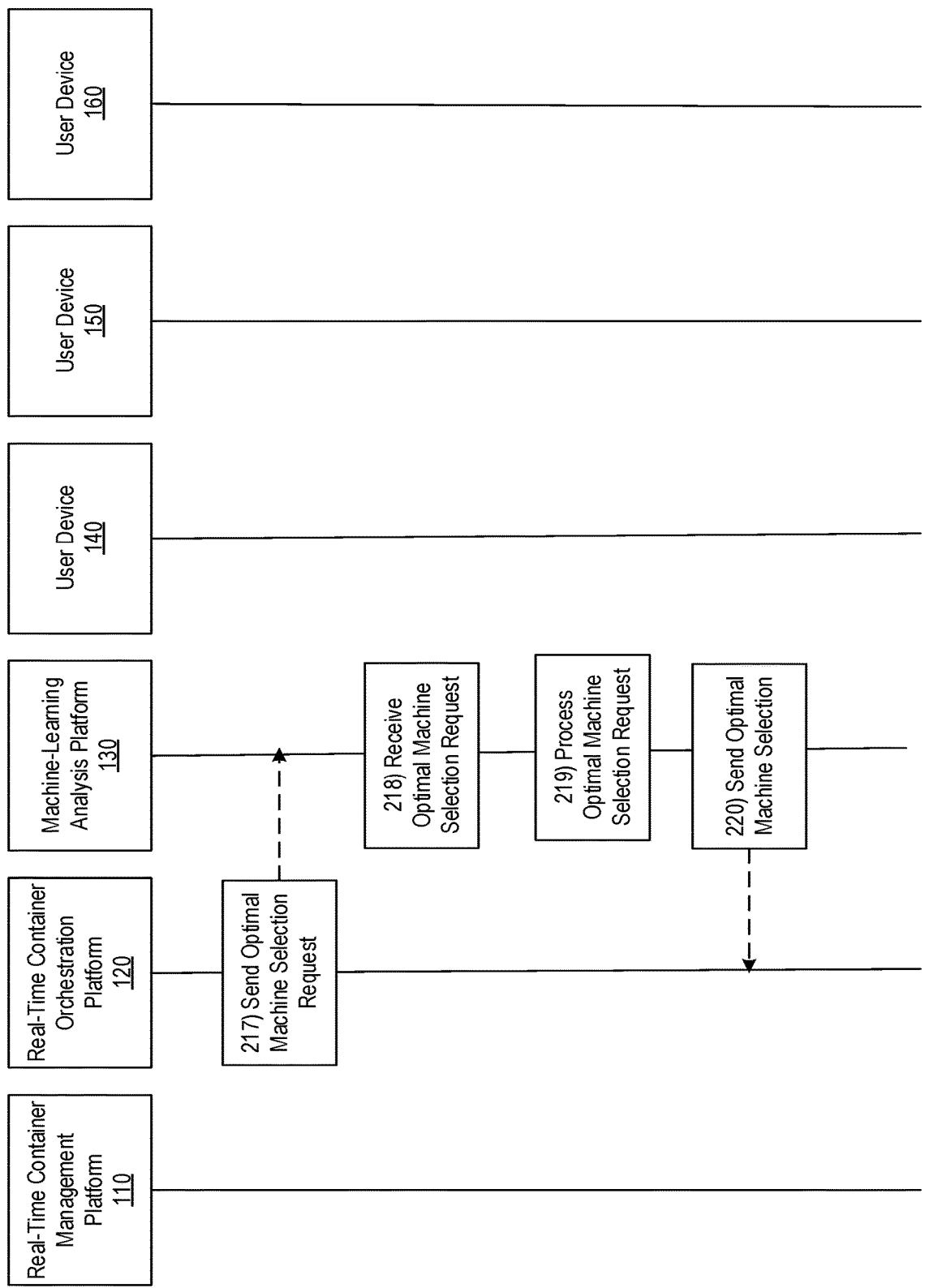
Figure 2F:
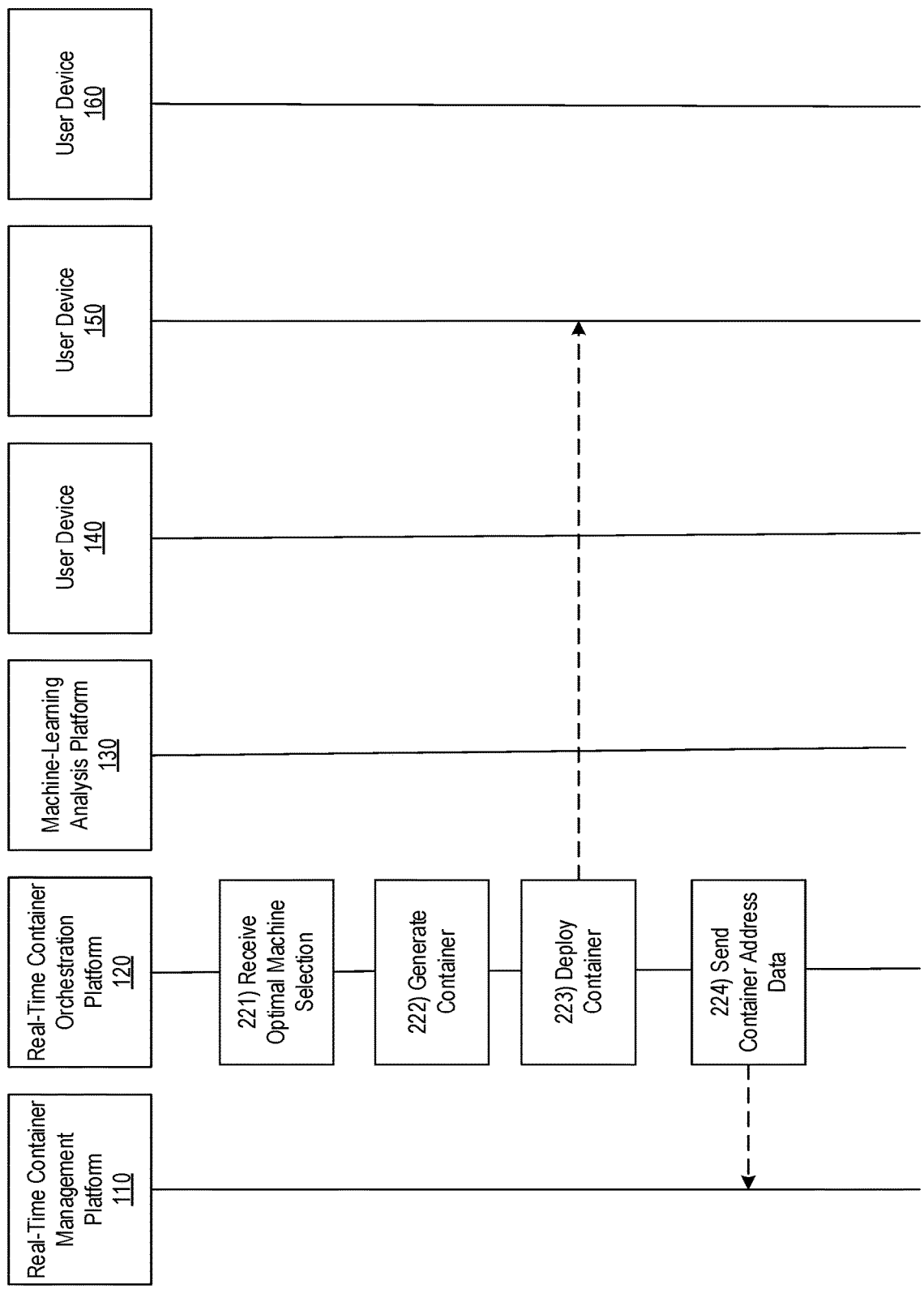
Figure 21:
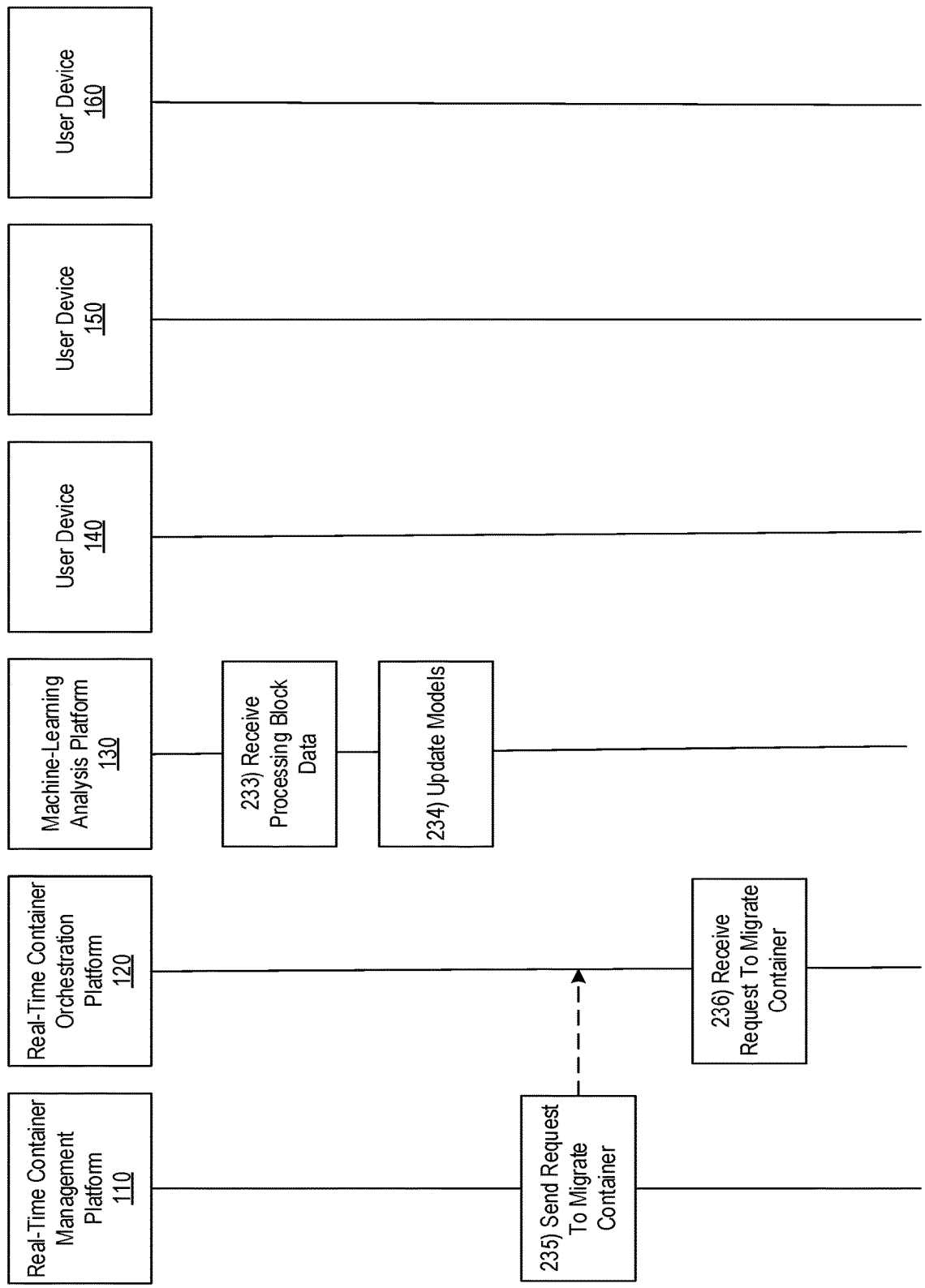
Figure 2J:
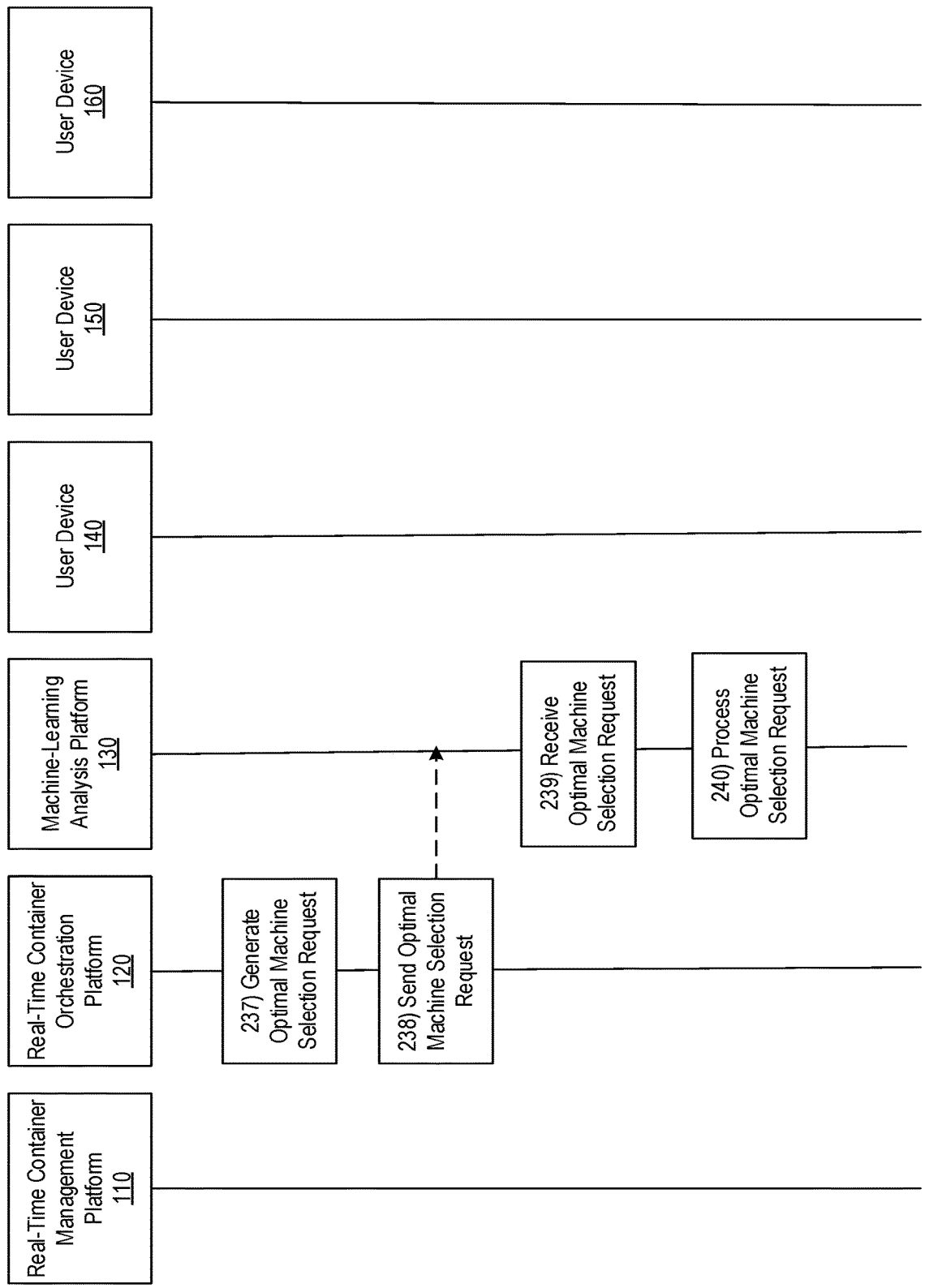
Figure 2L:
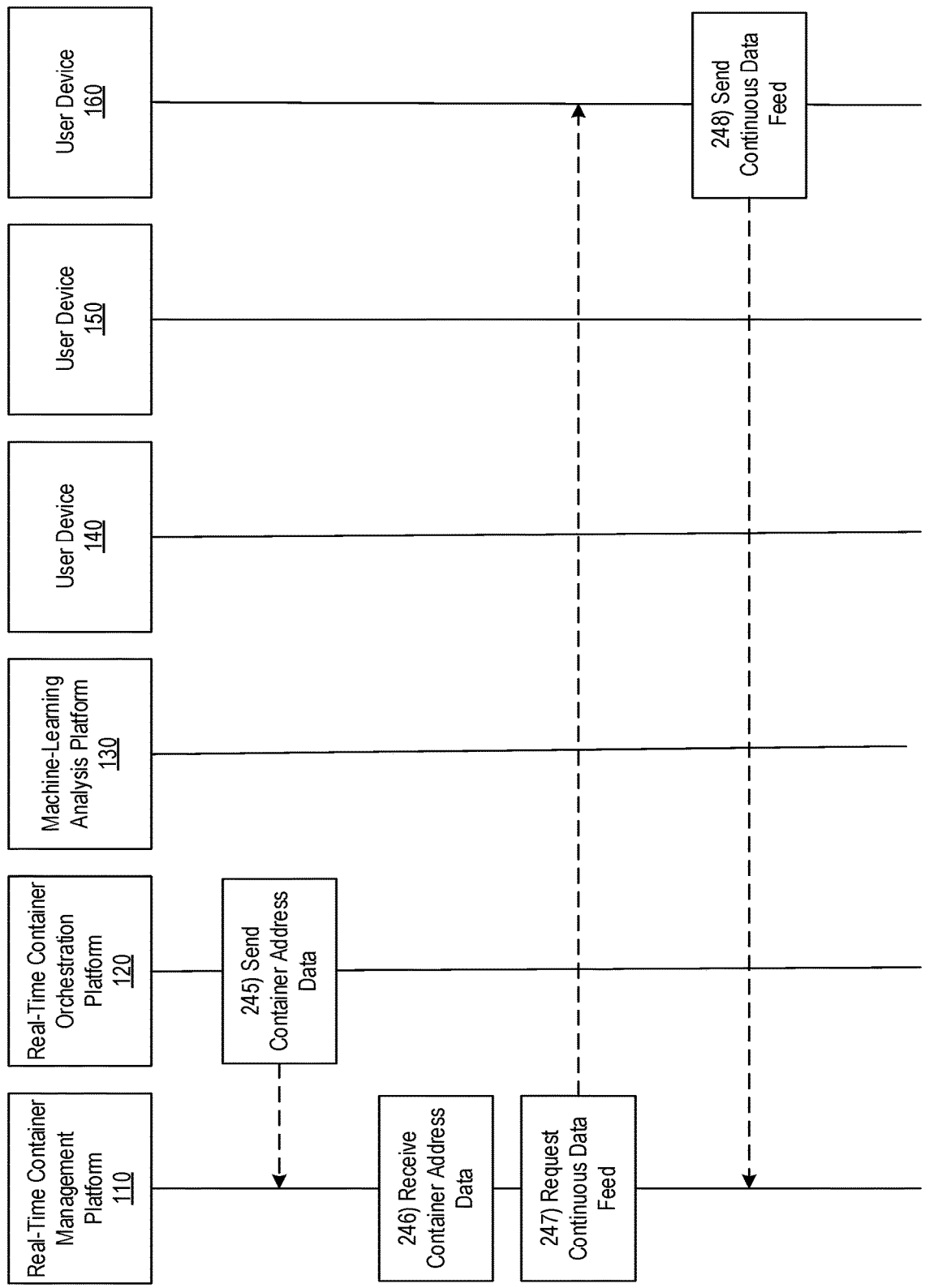
Figure 2O:
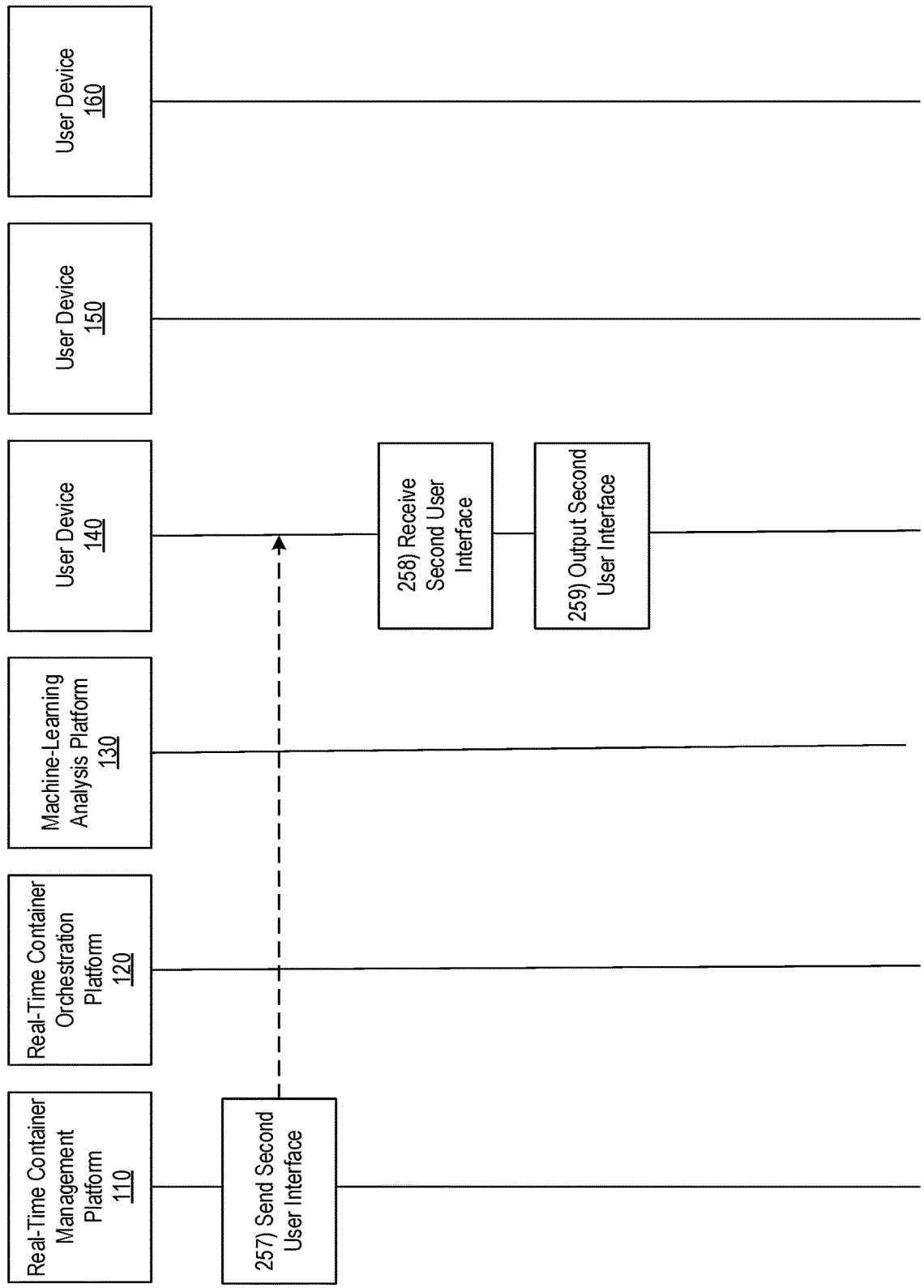

FIGS. 2A-2O depict an illustrative event sequence for implementing a real-time dynamic container optimization computing platform 105 in accordance with one or more example embodiments. Referring to FIG. 2A, at step 201, machine-learning analysis platform 130 of real-time dynamic container optimization platform 105 may receive device utilization data from one or more user devices, such as user device 140, user device 150, and/or user device 160. The device utilization data from user device 140, user device 150, and/or user device 160 may be sent in real-time or at predefined time intervals. The predefined time intervals may be determined by any of real-time container management platform 110, real-time container orchestration platform 120, machine-learning analysis platform 130, user device 140, user device 150, and/or user device 160. The device utilization data may be collected by a data aggregator agent executing on the sending device (for example, user device 140, user device 150, or user device 160) and then sent by the data aggregator agent from the sending device to machine-learning analysis platform 130.

Prior to sending the device utilization data, the data aggregator agent of each sending device may supplement the device utilization data with additional data. For example, the data aggregator agent may supplement the device utilization data with data identifying the device from which the device utilization data is sent (for example, user device 140, user device 150, or user device 160). Additionally, or alternatively, the data aggregator agent may supplement the device utilization data with timestamp information for the device utilization data.

The device utilization data may be indicative of the load of the sending device (for example, user device 140, user device 150, or user device 160). This may include, for example, CPU usage, RAM usage, storage usage, and/or the like for the sending device. The data aggregator agent may send these data points to machine-learning analysis platform 130 in raw form. Additionally, or alternatively, the data aggregator agent may process the data to calculate a utilization value based on one or more of the aforementioned data points (CPU usage, RAM usage, storage usage, and/or the like), and may send the utilization value to machine-learning analysis platform 130.

At step 202, machine-learning analysis platform 130 may receive the device utilization data from one or more of user device 140, user device 150, and/or user device 160. Machine-learning analysis platform 130 may store the device utilization data received from one or more of user device 140, user device 150, and/or user device 160 within the memory of machine-learning analysis platform 130. At step 203, machine-learning analysis platform 130 may update one or more cumulative models maintained by machine-learning analysis platform 130 based on the device utilization data received from one or more of user device 140, user device 150, and/or user device 160 at step 202.

The cumulative models maintained by machine-learning analysis platform 130 may each be a combination of a historical model and a machine-learning model. Each cumulative model maintained by machine-learning analysis platform 130 may be associated with a single computing device (such as user device 140, user device 150, or user device 160), or a combination of computing devices (such as user device 140, user device 150, and/or user device 160). In addition to the historical model and the machine-learning model, the cumulative model may further include a confidence factor that may be updated by machine-learning analysis platform 130 based on real-time utilization data received from user device 140, user device 150, and/or user device 160 (as discussed above with reference to step 201) and/or processing block data received from real-time container management platform 110 (as discussed below with reference to steps 232 and 252).

The historical model of a cumulative model of a computing device may be based on static historical data associated with that computing device. For example, the historical model may be based on the maximum computational capabilities of that computing device, such as the maximum available CPU capability of that computing device, the maximum available RAM capability of that computing device, the maximum storage capability of that computing device, and/or the like.

The machine learning model of a cumulative model of a computing device may be based on dynamic device utilization data received by machine-learning analysis platform 130 from the computing device (as discussed above with reference to step 201). The machine learning model for a given computing device may be continuously updated by machine-learning analysis platform 130 each time machine-learning analysis platform 130 receives device utilization data from the computing device.

The cumulative model for a computing device may be designed to model (collectively, using the historical model for the cumulative model and the machine learning model for the cumulative model) the utilization data for that computing device, and to predict the computational availability of that computing device for a future time frame. For example, machine-learning analysis platform 130 may input, into the cumulative model for a computing device, computational requirements for execution of a container on that computing device for a particular date(s) and/or time(s). The cumulative model for that computing device may output, in response to receiving the input comprising computational requirements for execution of a container on that computing device for a particular date(s) and/or time(s), a predictor value. The predictor value may represent the likelihood of successfully executing a container with the inputted computational requirements on the computing device on the inputted date(s) and time(s). The steps of 201, 202, and 203 may be part of a continuous loop. That is, user device 140, user device 150, and/or user device 160 may continuously perform step 201, and in response, machine-learning analysis platform 130 may continuously perform steps 202 and 203.

At step 204, user device 140 may send a request to create a processing block to real-time container management platform 110. In one example, a processing block may be a continuous integration job build that requires the deployment of a container.

Figure 3A:
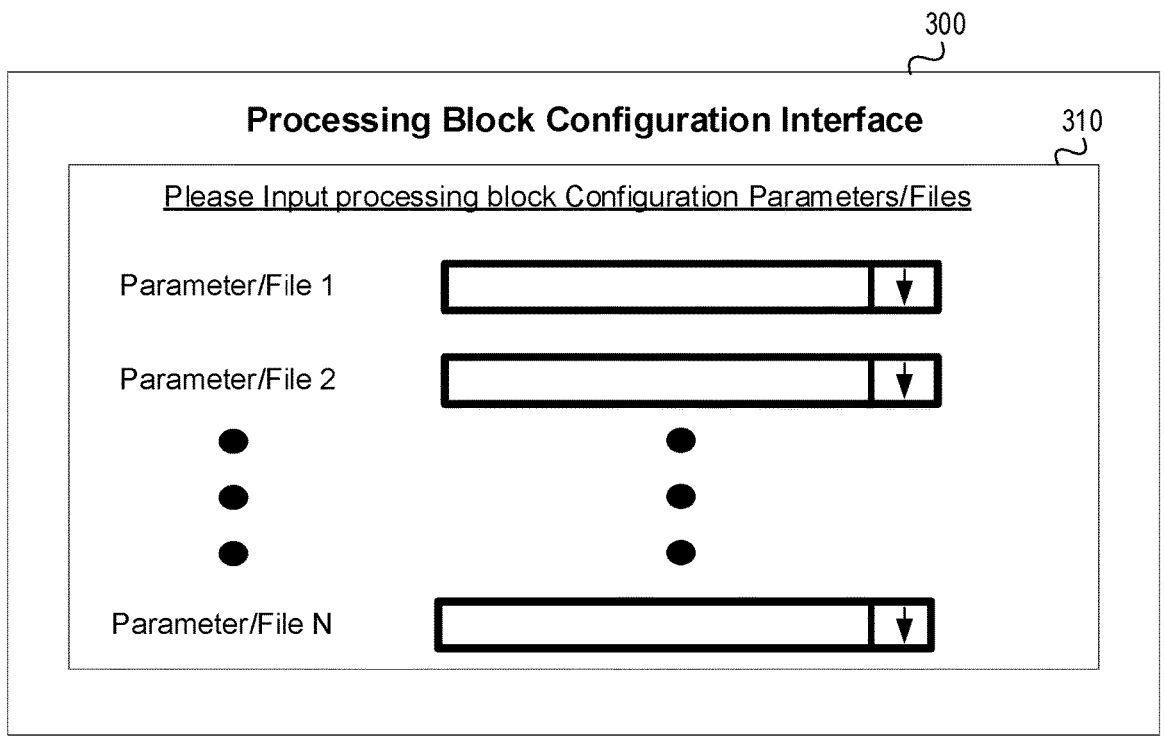
FIGS. 3A-3B depict illustrative graphical user interfaces that implement a real-time dynamic container optimization computing platform in accordance with one or more example embodiments.

Referring to FIG. 2B, at step 205, real-time container management platform 110 may receive, from user device 140, the request to create a processing block. In response to receiving the request from user device 140, real-time container management platform 110 may, at step 206, generate a first graphical user interface for the processing block. Referring to FIG. 3A, the graphical user interface 300 generated by real-time container management platform 110 at step 206 may comprise a processing block configuration interface that may include an input section 310. A user may input, via input section 310, one or more parameters for the processing block requested by the user. For example, the user may input a date of execution for the processing block as Parameter 1 and a time of execution for the processing block as Parameter 2. The user may additionally or alternatively upload one or more configuration files to be used during the creation and/or execution of the processing block via input section 310.

Referring back to FIG. 2B, at step 207, real-time container management platform 110 may send the first graphical user interface 300 generated by real-time container management platform 110 at step 206 to user device 140. The sending of the first graphical user interface 300 from real-time container management platform 110 to user device 140 may cause or be configured to cause user device 140 to output the first graphical user interface 300 for display on a display device of user device 140. Specifically, at step 208, user device 140 may receive the first graphical user interface 300 sent by real-time container management platform 110 to user device 140 at step 207. Referring to FIG. 2C, at step 209, and in response to receiving the first graphical user interface 300 at step 208, user device 140 may output the first graphical user interface 300 to a display device of user device 140. At step 210, user device 140 may receive, via the input section 310 of first graphical user interface 300, first data. The first data may comprise a set of one or more configuration parameters and/or files for the processing block requested by user device 140 at step 204. At step 211, user device 140 may send the first data received at step 210 via input section 310 of first graphical user interface 300 to real-time container management platform 110. At step 212, real-time container management platform 110 may receive the first data sent by user device 140 at step 211.

Referring to FIG. 2D, at step 213, real-time container management platform 110 may generate a request for a first processing block. The request for the first processing block may comprise the first data received by real-time container management platform 110 from user device 140 at step 212. Additionally, or alternatively, the request for the first processing block may include data generated by real-time container management platform 110 based on an analysis of the first data received by real-time container management platform 110 from user device 140 at step 212. For example, real-time container management platform 110 may analyze the first data received by real-time container management platform 110 from user device 140 at step 212 to determine computational requirements for the first processing block. At step 214, real-time container management platform 110 may send the request for the first processing block (which, as discussed above, may include the first data received by real-time container management platform 110 from user device 140 and/or additional data generated by real-time container management platform 110 based on its analysis of the first data received by real-time container management platform 110 from user device 140) to real-time container orchestration platform 120. At step 215, real-time container orchestration platform 120 may receive the request for the first processing block from real-time container management platform 110. In order to determine the specific computing device (i.e., user device 140, user device 150, or user device 160) on which the first processing block is to be created, real-time container orchestration platform 120 may generate, at step 216, a first optimal machine selection request. The first optimal machine selection request may include the data received in the request for the first processing block. If the data received in the request for the first processing block does not include the computational requirements for the first processing block (that is, if the data received in the request from the first processing block only includes the first data received by real-time container management platform 110 from user device 140 via input section 310 of first graphical user interface 300), real-time container orchestration platform 120 may analyze the first data to generate the computational requirements for the first processing block. Thus, the first optimal machine selection request may include the first data received by real-time container management platform 110 from user device 140 via input section 310 of the first graphical user interface 300, as well as the computational requirements for the first processing block (which may be generated by real-time container management platform 110 and/or real-time container orchestration platform 120 based on analysis of that first data).

Referring to FIG. 2E, at step 217, real-time container orchestration platform 120 may send the first optimal machine selection request to machine-learning analysis platform 130. At step 218, machine-learning analysis platform 130 may receive the first optimal machine selection request from real-time container orchestration platform 120. At step 219, machine-learning analysis platform 130 may process the first optimal machine selection request. To process the first optimal machine selection request, machine-learning analysis platform 130 may extract the first data and the computational requirements for the first processing block from the first optimal machine selection request. Machine-learning analysis platform 130 may then input the first data (or a portion thereof) and the computational requirements into each of its cumulative models. The cumulative models may be stored in a database at machine-learning analysis platform 130 and inputting the first data and the computational requirements into each of its cumulative models may comprise sending one or more queries to the database of machine-learning analysis platform 130.

In response to inputting the first data and the computational requirements for the first processing block into each of its cumulative models, machine-learning analysis platform 130 may receive, from each cumulative model, a predictor value. The predictor value received from a particular cumulative model may represent the likelihood of successfully executing, on a computing device associated with that cumulative model, a container with the inputted computational requirements on the computing device on the inputted date(s) and time(s). Machine-learning analysis platform 130 may then compare each of the predictor values outputted by its cumulative models to select the computing device associated with the cumulative model that outputted the highest predictor value. For example, at step 219, machine-learning analysis platform 130 may execute each of its cumulative models using the data extracted from the first optimal machine selection request received at step 218 and determine that the cumulative model associated with user device 150 generated the highest predictor value. Thus, at step 219, machine-learning analysis platform 130 may determine that a first selected optimal machine for creating the first processing block is user device 150. At step 220, machine-learning analysis platform 130 may send data identifying the first selected optimal machine to real-time container orchestration platform 120. For example, the data may include a device identifier of the first selected optimal machine, an IP address of the first selected optimal machine, and/or the like.

Referring to FIG. 2F, at step 221, real-time container orchestration platform 120 may receive, from machine-learning analysis platform 130, the first selected optimal machine. At step 222, the real-time container orchestration platform 120 may generate a container for the first processing block. The real-time container orchestration platform 120 may generate the container based on the first selected optimal machine, the first data received by real-time container management platform 110 from user device 140 via input section 310 of the first graphical user interface 300, and/or the results of the analysis performed on the first data by real-time container management platform 110 or real-time container orchestration platform 120. At step 223, real-time container orchestration platform 120 may deploy the container generated at step 222 to the first selected optimal machine. For example, real-time container orchestration platform 120 may deploy the container generated at step 222 to user device 150 by sending the container to user device 150. At step 224, real-time container orchestration platform 120 may send container address data of the container deployed at step 223 to real-time container management platform 110. The container address data may include an IP address of the container. In one example, the container address data may be assigned to the container during generation of the container at step 222. In another example, real-time container orchestration platform 120 may query the first selected optimal machine (here, user device 150) for the container address data prior to sending the container address data to real-time container management platform 110. In another example, the first selected optimal machine may automatically send the container address data to real-time container orchestration platform 120 in response to receiving the container from real-time container orchestration platform 120 at step 223.

Referring to FIG. 2G, at step 225, real-time container management platform 110 may receive the container address data from real-time container orchestration platform 120. At step 226, real-time container management platform 110 may complete creation of the first processing block. For example, real-time container management platform 110 may communicate with the first selected optimal machine and/or the container (via the container address data received from real-time container orchestration platform 120 at step 225) to complete creation of the first processing block (which, as indicated above, may be a continuous integration job build). To complete creation of the first processing block, real-time container management platform 110 may send additional data to the container, publish the build, and/or the like. For example, real-time container management platform 110 may direct the selected first selected optimal machine to retrieve code for the first processing block from a source control system. In another example, real-time container management platform 110 may retrieve code for the first processing block from the source control system and send the retrieved code to the first selected optimal machine (or directly to the container). At step 227, real-time container management platform 110 may begin monitoring execution of the container by requesting, from the container (via the container address data received from real-time container orchestration platform 120 at step 225), a continuous feed of performance data of the container. In response to this request, at step 228, the container, which is executing here on user device 150, the first selected optimal machine, may send a continuous feed of container performance data to real-time container management platform 110. The container performance data may indicate various performance parameters of the container execution, such as the utilization by the container of the computational resources of the selected first selected optimal machine, whether there have been any errors in the execution of the container, whether execution of the container has stopped, whether execution of the container has been completed, and/or the like. The container (or specifically, a container agent executing therein) may send the container performance data to real-time container management platform 110 in real-time or at a predefined time interval. The predetermined time interval may be determined by any of real-time container management platform 110, real-time container orchestration platform 120, machine-learning analysis platform 130, and/or the first selected optimal machine.

Referring to FIG. 2H, at step 229, real-time container management platform 110 may receive the continuous data feed from the container executing on the first selected optimal machine (here, user device 150). Real-time container management platform 110 may continuously monitor the data received from the container executing on the first selected optimal machine to determine whether execution of the container is proceeding without an issue or whether the data received from the container indicates a processing block management trigger. A processing block management trigger may indicate that the container execution has run into an issue or is complete (for example, that there was an error during execution of the container, that execution of the container has paused, that execution of the container is overutilizing the computational resources of the first selected optimal machine, and/or the like).

At step 230, real-time container management platform 110 may detect, from the continuous data feed, a first processing block management trigger. Here, for example, the first processing block management trigger may be an indication that execution of the container on the first selected optimal machine is overutilizing the computational resources of the first selected optimal machine. At step 231, in response to detecting the first processing block management trigger at step 230, real-time container management platform 110 may send a first processing block command to the first selected optimal machine (here, user device 150). The processing block command may be a command to pause execution of the container for a predefined time interval, continue execution of the container, stop execution of the container, an acknowledgment of completion of execution of the command, and/or the like. In this example, the first processing block command sent from real-time container management platform 110 to the first selected optimal machine may instruct the first selected optimal machine (here, user device 150) to stop execution of the container, in response to real-time container management platform 110 determining that execution of the container on the first selected optimal machine is overutilizing the resources of the first selected optimal machine.

At step 232, real-time container management platform 110 may send processing block data to machine-learning analysis platform 130. The processing block data may be generated by real-time container management platform 110 based on the continuous data feed received by real-time container management platform 110 at step 229 and/or from the first processing block management trigger detected by real-time container management platform 110 at step 230. For example, if the first processing block management trigger detected by real-time container management platform 110 at step 230 indicates that execution of the container on the first selected optimal machine is overutilizing the computational resources of the first selected optimal machine, real-time container management platform 110 may send the first processing block management trigger to machine-learning analysis platform 130, along with data indicating the amount of computational resources of the first selected optimal machine utilized by execution of the container. The processing block data may include an identifier of the first selected optimal machine on which the container is executing.

Referring to FIG. 2I, at step 233, machine-learning analysis platform 130 may receive the processing block data from real-time container management platform 110. At step 234, machine-learning analysis platform 130 may update the cumulative model associated the first selected optimal machine based on the processing block data. Machine-learning analysis platform 130 may first extract the identity of the first selected optimal machine from the processing block data. Machine-learning analysis platform 130 may then retrieve the cumulative model associated with the first selected optimal machine. Machine-learning analysis platform 130 may then update the retrieved cumulative model based on the processing block data. For example, here, the processing block data indicates that execution of the container on the first selected optimal machine resulted in overutilization of the computational resources of the first selected optimal machine by the container. Thus, here, machine-learning analysis platform 130 may negatively reward the machine learning model of the cumulative model of the first selected optimal machine (which, as discussed above, outputted a high predictor value indicating that the container would successfully execute on the first selected optimal machine). Machine-learning analysis platform 130 may scale the negative reward based on the amount of overutilization of the computational resources of the first selected optimal machine by execution of the container.

At step 235, real-time container management platform 110 may send a request to migrate the container to real-time container orchestration platform 120. Real-time container management platform 110 may send the request to migrate the container in response to detecting the first processing block management trigger at step 230. The request to migrate the container may include the address data of the container (i.e., the IP address of the container, a device identifier of the first selected optimal machine). The request to migrate the container may additionally include computational resource requirements for execution of the container. The computational resource requirement for execution of the container may be determined by the container itself, or by real-time container management platform 110, based on the continuous data feed received by real-time container management platform 110 from the first selected optimal machine. At step 236, real-time container orchestration platform 120 may receive the request from real-time container management platform 110 to migrate the container.

Referring to FIG. 2J, at step 237, in response to receiving the request to migrate the container, real-time container orchestration platform 120 may generate a second optimal machine selection request. The second optimal machine selection request generated by real-time container orchestration platform 120 may include the computational resources requirement for execution of the container. At step 238, real-time container orchestration platform 120 may send the second optimal machine selection request to machine-learning analysis platform 130. At step 239, machine-learning analysis platform 130 may receive the second optimal machine selection request from real-time container orchestration platform 120. At step 240, machine-learning analysis platform 130 may process the second optimal machine selection request. To process the second optimal machine selection request, machine-learning analysis platform 130 may first extract the computational requirements for execution of the container from the second optimal machine selection request. Machine-learning analysis platform 130 may then input the computational requirements into each of its cumulative models. In response to inputting the computations requirements for execution of the container into each of its cumulative models, machine-learning analysis platform 130 may receive, from each cumulative model, a predictor value. As discussed above, the predictor value received from a particular cumulative model may represent the likelihood of successfully executing, on a computing device associated with that cumulative model, the container with the inputted computational requirements on the computing device. Machine-learning analysis platform 130 may then compare each of the predictor values outputted by its cumulative models to select the computing device associated with the cumulative model that outputted the highest predictor value. For example, at step 240, machine-learning analysis platform 130 may execute each of its cumulative models using the data extracted from the second optimal machine selection request received at step 239 and determine that the cumulative model associated with user device 160 outputted the highest predictor value. Thus, at step 240, machine-learning analysis platform 130 may determine that the second selected optimal machine for execution of the container is user device 160.

Referring to FIG. 2K, at step 241, machine-learning analysis platform 130 may send data identifying the second selected optimal machine to real-time container orchestration platform 120. For example, the data may include a device identifier of the second selected optimal machine, an IP address of the second selected optimal machine, and/or the like. At step 242, real-time container orchestration platform 120 may receive the second selected optimal machine from machine-learning analysis platform 130. At step 243, real-time container orchestration platform 120 may generate the container to be migrated to the second selected optimal machine (here, user device 160). Real-time container orchestration platform 120 may generate the container to be migrated to the second selected optimal machine by retrieving the container from the first selected optimal machine (here, user device 150). At step 244, real-time container orchestration platform 120 may deploy the container to the second selected optimal machine. For example, real-time container orchestration platform 120 may deploy the container to the second selected optimal machine by sending the container retrieved from the first selected optimal machine to the second selected optimal machine (here, user device 160). Alternatively, real-time container orchestration platform 120 may deploy the container to the second selected optimal machine by sending the address data of the container to the second selected optimal machine, along with instructions for the second selected optimal machine to retrieve the container.

Referring to FIG. 2L, at step 245, real-time container orchestration platform 120 may send the address data of the container deployed at step 244 to real-time container management platform 110. The container address data may include the IP address of the container. In one example, the container address data may be assigned to the container during generation of the container at step 243. In another example, real-time container orchestration platform 120 may query the second selected optimal machine (here, user device 160) for the container address data prior to sending the container address data to real-time container management platform 110. In another example, the second selected optimal machine may automatically send the container address data to real-time container orchestration platform 120 in response to receiving the container from real-time container orchestration platform 120 or the first selected optimal machine at step 244. At step 246, real-time container management platform 110 may receive the container address data from real-time container orchestration platform 120.

At step 247, real-time container management platform 110 may begin monitoring execution of the container by requesting, from the container (via the container address data received from real-time container orchestration platform 120 at step 246), a continuous feed of performance data. In response to this request, at step 248, the container, which is executing here on the second selected optimal machine, user device 160, may send a continuous feed of container performance data to real-time container management platform 110. The container performance data may indicate various performance parameters of the container execution, such as the utilization by the container of the computational resources of the second selected optimal machine, whether there have been any errors in the execution of the container, whether execution of the container has stopped, whether execution of the container has completed, and/or the like. The container (or specifically, a container agent executing therein) may send the performance data to real-time container management platform 110 in real-time or at a predefined time interval. The predetermined time interval may be determined by any of real-time container management platform 110, real-time container orchestration platform 120, machine-learning analysis platform 130, and/or the second selected optimal machine.

Referring to FIG. 2M, at step 249, real-time container management platform 110 may receive the continuous data feed from the container executing on the second selected optimal machine (here, user device 160). Real-time container management platform 110 may continuously monitor the container performance data received from the container executing on the second selected optimal machine to determine whether execution of the container is proceeding without an issue or whether the container performance data received from the container indicates a processing block management trigger. As discussed above, a processing block management trigger may indicate that the container execution has run into an issue (for example, that there was an error during execution of the container, that execution of the container has paused, that execution of the container is overutilizing the computational resources of the selected optimal machine, and/or the like).

At step 250, real-time container management platform 110 may detect, from the continuous data feed, a second processing block management trigger. Here, for example, the second processing block management trigger may be an indication that execution of the container on the second selected optimal machine is complete. At step 251, in response to detecting the second processing block management trigger at step 250, real-time container management platform 110 may send a second processing block command to the second selected optimal machine (here, user device 160). As discussed above, a processing block command may be a command to pause execution of the container for a predefined time interval, continue execution of the container, stop execution of the container, an acknowledgement of completion of execution of the container and/or the like. In this example, the second processing block command sent from real-time container management platform 110 to the second selected optimal machine may comprise an acknowledgement of completion of execution of the container.

At step 252, real-time container management platform 110 may send processing block data to machine-learning analysis platform 130. The processing block data may be generated by real-time container management platform 110 based on the continuous data feed received by real-time container management platform 110 at step 249 and/or from the second processing block management trigger detected by real-time container management platform 110 at step 250. For example, if the second processing block management trigger detected by real-time container management platform 110 at step 250 indicates that execution of the container on the second selected optimal machine is complete, real-time container management platform 110 may send the second processing block management trigger to machine-learning analysis platform 130, along with the data indicating the amount of computational resources of the second selected optimal machine utilized by execution of the container. The second processing block command may include an identifier of the second selected optimal machine on which the container was executing.

Referring to FIG. 2N, at step 253, machine-learning analysis platform 130 may receive the processing block data from real-time container management platform 110. At step 254, machine-learning analysis platform 130 may update the cumulative model associated the second selected optimal machine based on the processing block data received at step 253. Machine-learning analysis platform 130 may first extract the identity of the second selected optimal machine from the processing block data. Machine-learning analysis platform 130 may then retrieve the cumulative model associated with the second selected optimal machine. Machine-learning analysis platform 130 may then update the retrieved cumulative model based on the processing block data. For example, here, the processing block data indicates that execution of the container on the second selected optimal machine was successfully completed. Thus, here, machine-learning analysis platform 130 may positively reward the machine learning model of the cumulative model of the second selected optimal machine.

Figure 3B:
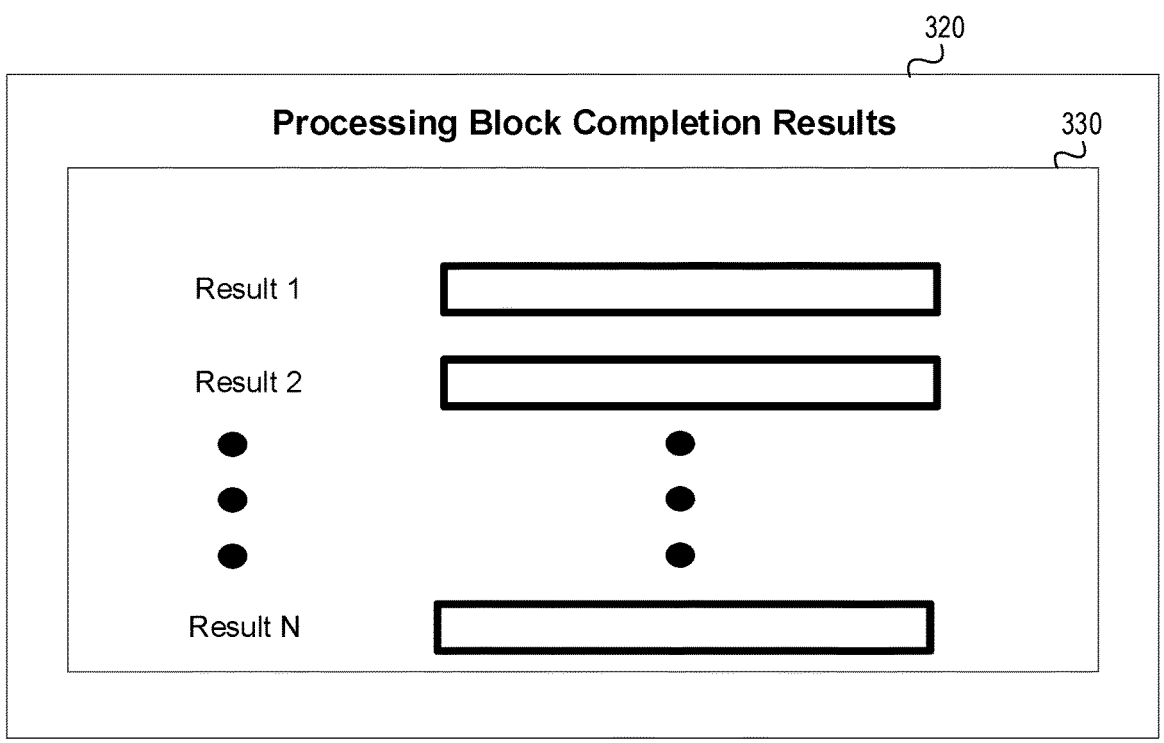

At step 255, in response to determining that execution of the container on the second selected optimal machine was successfully completed, real-time container orchestration platform 120 may terminate the container on the second selected optimal machine. Real-time container orchestration platform 120 may terminate the container by destroying the container. At step 256, in response to determining that execution of the container on the second selected optimal machine was successfully completed, real-time container management platform 110 may generate a second graphical user interface. Referring to FIG. 3B, the second graphical user interface 320 may include output section 330 indicating the execution results of the processing block associated with the container. Real-time container management platform 110 may retrieve the execution results from the second selected optimal machine, or directly from the container.

Referring to FIG. 2O, at step 257, real-time container management platform 110 may send the second graphical user interface to user device 140, the computing device that originally requested the creation of the processing block associated with the container. The sending of the second graphical user interface by real-time container management platform 110 to user device 140 may cause or be configured to cause user device 140 to output the second graphical user interface to a display device associated with user device 140. Specifically, at step 258, user device 140 may receive the second graphical user interface from real-time container management platform 110. At step 259, in response to receiving the second graphical user interface from real-time container management platform 110, user device 140 may output the second graphical user interface to a display device associated with user device 140.

Figure 4A:
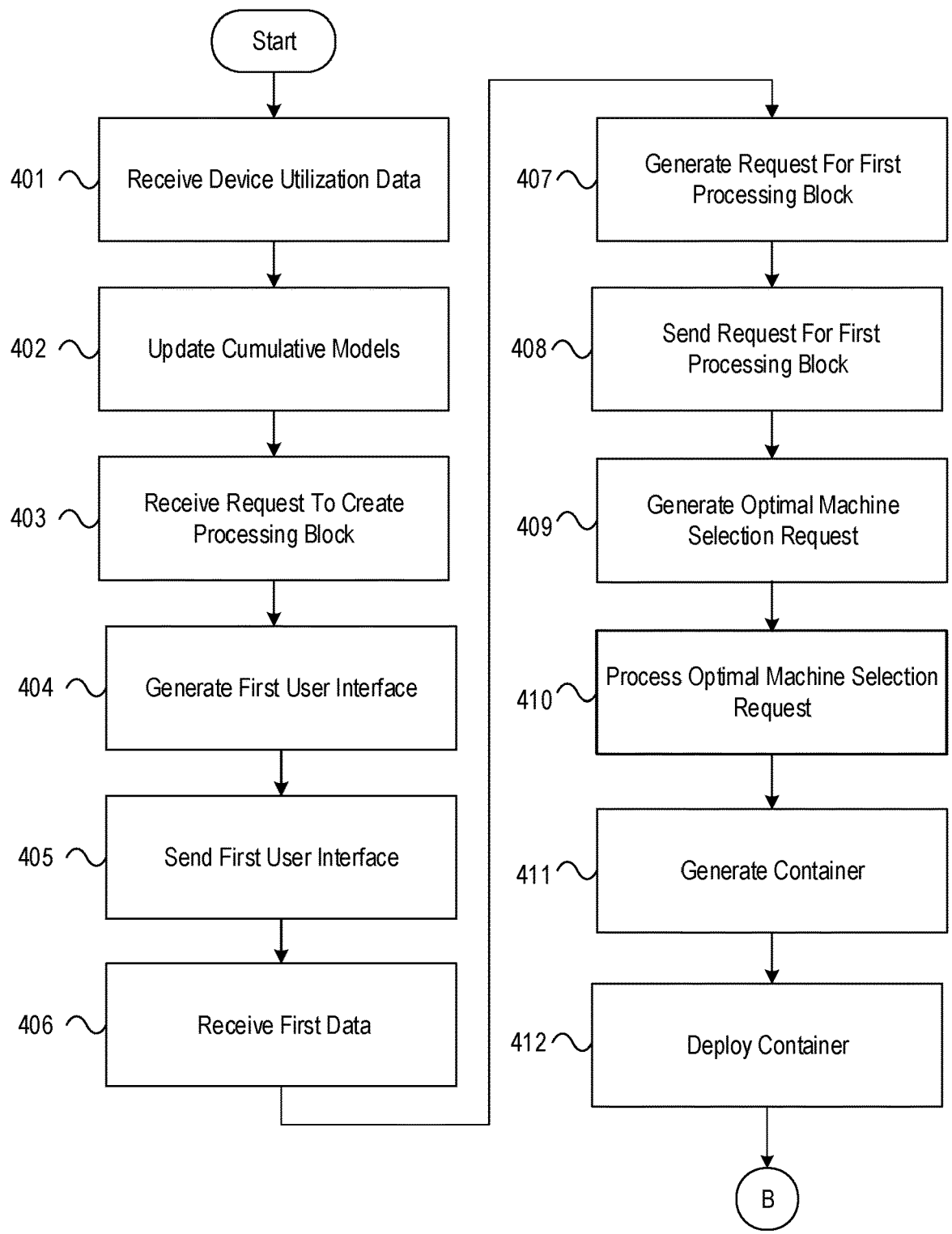
FIGS. 4A-4C depicts an illustrative method for a real-time dynamic container optimization computing platform in accordance with one or more example embodiments.
Figure 4B:
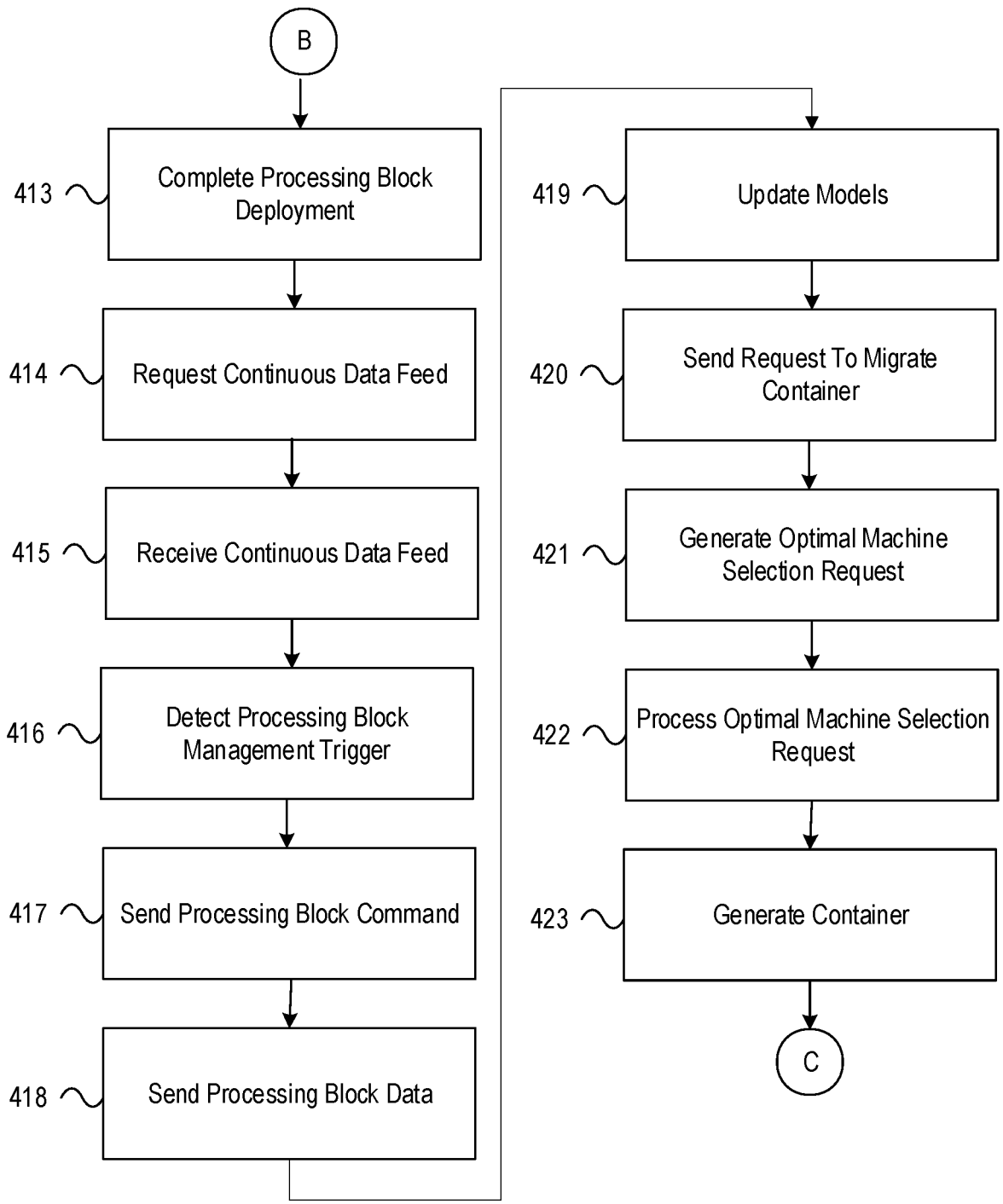
Figure 4C:
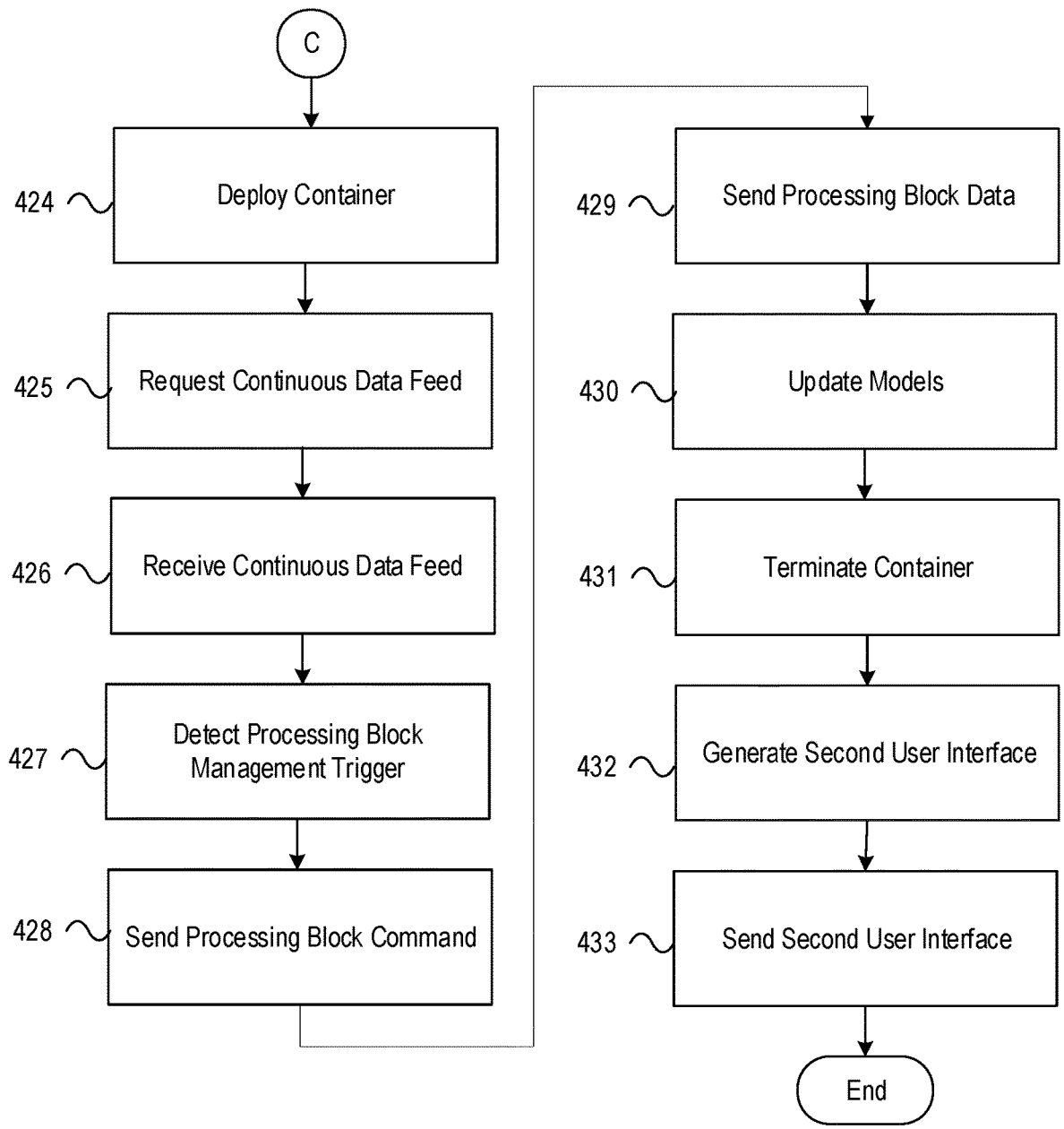

FIGS. 4A-4C depict an illustrative method for implementing a real-time dynamic container optimization computing platform in accordance with one or more example embodiments. Referring to FIG. 4A, at step 401, a machine-learning analysis platform, part of a real-time dynamic container optimization computing platform and having at least one processor, a communication interface, and memory, may receive device utilization data from one or more user devices. At step 402, the machine-learning analysis platform may update one or more cumulative models based on the device utilization data. At step 403, a real-time container management platform, part of a real-time dynamic container optimization computing platform and having at least one processor, a communication interface, and memory, may receive a request to create a processing block from a first user device. At step 404, the real-time container management platform may generate a first graphical user interface. At step 405, the real-time container management platform may send the first graphical user interface to the first user device, wherein sending of the first graphical user interface by the real-time container management platform to the first user device may be configured to cause the first user device to output the first graphical user interface for display on a display device of the first user device. At step 406, the real-time container management platform may receive first data from the first user device. At step 407, the real-time container management platform may generate a request for a first processing block. At step 408, the real-time container management platform may send the request for the first processing block to a real-time container orchestration platform. At step 409, the real-time container orchestration platform, part of a real-time dynamic container optimization computing platform and having at least one processor, a communication interface, and memory, may generate a first optimal machine selection request. At step 410, the machine-learning analysis platform may process the first optimal machine selection request to identify a first selected optimal machine. At step 411, the real-time container orchestration platform may generate a container. At step 412, the real-time container orchestration platform may deploy the container to the first selected optimal machine.

Referring to FIG. 4B, at step 413, the real-time container management platform may complete deployment of the first processing block. At step 414, the real-time container management platform may request a continuous data feed from the first selected optimal machine and/or the container. At step 415, the real-time container management platform may receive a continuous data feed of container performance data from the first selected optimal machine and/or the container. At step 416, the real-time container management platform may detect a first processing block management trigger in the continuous data feed of container performance data. At step 417, the real-time container management platform may send a first processing block command to the first selected optimal machine. At step 418, the real-time container management platform may send processing block data to the machine-learning analysis platform. At step 419, the machine-learning analysis platform may update a cumulative model associated with the first selected optimal machine based on the processing block data. At step 420, the real-time container management platform may send a request to migrate the container to the real-time container orchestration platform. At step 421, in response to receiving the request to migrate the container, the real-time container orchestration platform may generate a second optimal machine selection request. At step 422, the machine-learning analysis platform may, in response to receiving the second optimal machine selection request from the real-time container orchestration platform, process the second optimal machine selection request to identify a second selected optimal machine. At step 423, the real-time container orchestration platform may generate the container for deployment to the second selected optimal machine.

Referring to FIG. 4C, at step 424, the real-time container orchestration platform may deploy the container to the second selected optimal machine. At step 425, the real-time container management platform may request a continuous data feed of container performance data from the second selected optimal machine. At step 426, the real-time container management platform may receive a continuous data feed of container performance data from the second selected optimal machine. At step 427, the real-time container management platform may detect a second processing block management trigger in the continuous data feed of container performance data received from the second selected optimal machine. At step 428, the real-time container management platform may send a second processing block command to the second selected optimal machine. At step 429, the real-time container management platform may send processing block data to the machine-learning analysis platform. At step 430, the machine-learning analysis platform may update a cumulative model associated with the second selected optimal machine based on the processing block data. At step 431, the real-time container orchestration platform may terminate the container. At step 432, the real-time container management platform may generate a second graphical user interface. At step 433, the real-time container management platform may send the second graphical user interface to the first user device, wherein sending the second graphical user interface to the first user device may be configured to cause the first graphical user interface to output the second graphical user interface for display on a display device of the first user device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
a real-time container management platform comprising:
a first processor;
a first communication interface communicatively coupled to the first processor; and
a first memory storing computer-readable instructions that, when executed by the first processor, cause the real-time container management platform to:
receive, from a user device, a first request to create a processing block;
generate, based on the first request to create the processing block, a first graphical user interface comprising a first section for receiving one or more parameters for the processing block and a second section for receiving one or more configuration files for the processing block;
send, to the user device, the first graphical user interface, wherein sending the first graphical user interface to the user device is configured to cause the user device to output the first graphical user interface for display to a display device of the user device;
receive, from the user device, first data comprising the received one or more parameters and second data comprising the received one or more configuration files;
generate, based on the first data and the second data, a second request for the processing block; and
send, to a real-time container orchestration platform, the second request; and
the real-time container orchestration platform, wherein the real-time container orchestration platform comprises:
a second processor;
a second communication interface communicatively coupled to the second processor; and
a second memory storing computer-readable instructions that, when executed by the second processor, cause the real-time container orchestration platform to:
generate, based on the second request, a first optimal machine selection request;
send, to a machine-learning analysis platform, the first optimal machine selection request;
receive, from the machine-learning analysis platform, a first selected optimal machine;
generate, based on the first request, a container;
deploy the container to the first selected optimal machine;
receive a request to migrate the container, the request comprising computational resource requirements for execution of the container, the computational resource requirements being determined by the real-time container management platform based on a continuous data feed received by the real-time container management platform from the first selected optimal machine;
receive, from the machine-learning analysis platform and in response to a second optimal machine selection request sent based on the request to migrate the container, a second selected optimal machine; and
migrate the container from the first selected optimal machine to the second selected optimal machine; and
the machine-learning analysis platform, wherein the machine-learning analysis platform comprises:
a third processor;
a third communication interface communicatively coupled to the third processor; and
a third memory storing computer-readable instructions that, when executed by the third processor, cause the machine-learning analysis platform to select the first selected optimal machine based on a plurality of cumulative models, wherein each cumulative model of the plurality of cumulative models is a combination of two different models associated with a different single computing device and predicts a computational availability of that different single computing device for a future time frame.

2. The system of claim 1, the first memory storing computer-readable instructions that, when executed by the first processor, cause the real-time container management platform to:
request, from the first selected optimal machine, container performance data; and
receive, from the first selected optimal machine, the container performance data.

3. The system of claim 2, wherein the container performance data is sent from the first selected optimal machine to the real-time container management platform in real-time.

4. The system of claim 2, wherein the container performance data is sent from the first selected optimal machine to the real-time container management platform at predefined intervals.

5. The system of claim 2, the first memory storing computer-readable instructions that, when executed by the first processor, cause the real-time container management platform to:
 detect, within the container performance data, a first processing block management trigger; and
 send, to the user device and based on the first processing block management trigger, a processing block command associated with the container.

6. The system of claim 2, the first memory storing computer-readable instructions that, when executed by the first processor, cause the real-time container management platform to:
 detect, within the container performance data, a first processing block management trigger; and
 send, to the machine-learning analysis platform and based on the first processing block management trigger, processing block data comprising the first processing block management trigger.

7. The system of claim 1, wherein a first cumulative model of the cumulative models is associated with a first computing device and comprises:
 a historical model comprising static data associated with the first computing device; and
 a machine-learning model comprising dynamic data associated with the first computing device.

8. The system of claim 7, the third memory storing computer-readable instructions that, when executed by the third processor, cause the machine-learning analysis platform to:
 receive, from the first computing device, utilization data for the first computing device; and
 update the first cumulative model based on the utilization data.

9. The system of claim 8, wherein the utilization data is sent from the first computing device to the machine-learning analysis platform in real-time.

10. The system of claim 8, wherein the utilization data is sent from the first computing device to the machine-learning analysis platform at predefined time intervals.

11. A method comprising:
 at a real-time container management platform, the real-time container management platform comprising at least one processor, a communication interface, and at least one memory:
  receiving, from a user device, a first request to create a processing block;
  generating, based on the first request to create the processing block, a first graphical user interface comprising a first section for receiving one or more parameters for the processing block and a second section for receiving one or more configuration files for the processing block;
  sending, to the user device, the first graphical user interface, wherein sending the first graphical user interface to the user device is configured to cause the user device to output the first graphical user interface for display to a display device of the user device;
  receiving, from the user device, first data first data comprising the received one or more parameters and second data comprising the received one or more configuration files; and
  generating, based on the first data and the second data, a second request for the processing block; and
  sending, to a real-time container orchestration platform, the second request; and at the real-time container orchestration platform,
 the real-time container orchestration platform comprising at least one processor, a communication interface, and at least one memory:
  generating, based on the second request, a first optimal machine selection request;
  sending, to a machine-learning analysis platform, the first optimal machine selection request;
  receiving, from the machine-learning analysis platform, a first selected optimal machine;
  generating, based on the first request, a container; and
  deploying the container to the first selected optimal machine;
  receive a request to migrate the container, the request comprising computational resource requirements for execution of the container, the computational resource requirements being determined by the real-time container management platform based on a continuous data feed received by the real-time container management platform from the first selected optimal machine;
  receive, from the machine-learning analysis platform and in response to a second optimal machine selection request sent based on the request to migrate the container, a second selected optimal machine; and
  migrate the container from the first selected optimal machine to the second selected optimal machine; and
 at the machine-learning analysis platform, the machine-learning analysis platform comprising at least one processor, a communication interface, and at least one memory:
  selecting the first selected optimal machine based on a plurality of cumulative models, wherein each cumulative model of the plurality of cumulative models is a combination of two different models associated with a different single computing device and predicts a computational availability of that different single computing device for a future time frame.

12. The method of claim 11, at the real-time container management platform:
 requesting, from the first selected optimal machine, container performance data; and
 receiving, from the first selected optimal machine, the container performance data.

13. The method of claim 12, wherein the container performance data is sent from the first selected optimal machine to the real-time container management platform in real-time.

14. The method of claim 12, wherein the container performance data is sent from the first selected optimal machine to the real-time container management platform at predefined intervals.

15. The method of claim 12, at the real-time container management platform:
 detecting, within the container performance data, a first processing block management trigger; and
 sending, to the user device and based on the first processing block management trigger, a processing block command associated with the container.

16. The method of claim 12, at the real-time container management platform:
 detecting, within the container performance data, a first processing block management trigger; and sending, to the machine-learning analysis platform and based on the first processing block management trigger, processing block data comprising the first processing block management trigger.

17. The method of claim 11, wherein a first cumulative model of the cumulative models is associated with a first computing device and comprises:
   a historical model comprising static data associated with the first computing device; and
   a machine-learning model comprising dynamic data associated with the first computing device.

18. The method of claim 17, at the machine-learning analysis platform:
   receiving, from the first computing device, utilization data for the first computing device; and
   updating the first cumulative model based on the utilization data.

19. The method of claim 18, wherein the utilization data is sent from the first computing device to the machine-learning analysis platform in real-time.

20. A plurality of non-transitory computer-readable media comprising:
   a first non-transitory computer-readable media storing instructions that, when executed by a real-time container management platform comprising at least one processor, a communication interface, and at least one memory, cause the real-time container management platform to:
      receive, from a user device, a first request to create a processing block;
      generate, based on the first request to create the processing block, a first graphical user interface comprising a first section for receiving one or more parameters for the processing block and a second section for receiving one or more configuration files for the processing block;
      send, to the user device, the first graphical user interface, wherein sending the first graphical user interface to the user device is configured to cause the user device to output the first graphical user interface for display to a display device of the user device;
      receive, from the user device, first data comprising the received one or more parameters and second data comprising the received one or more configuration files;
      generate, based on the first data and the second data, a second request for the processing block; and
      send, to a real-time container orchestration platform, the second request; and
   a second non-transitory computer-readable media storing instructions that, when executed by the real-time container orchestration platform comprising at least one processor, a communication interface, and at least one memory, cause the real-time container orchestration platform to:
      generate, based on the second request, a first optimal machine selection request;
      send, to a machine-learning analysis platform, the first optimal machine selection request;
      receive, from the machine-learning analysis platform, a first selected optimal machine;
      generate, based on the first request, a container; and
      deploy the container to the first selected optimal machine
      receive a request to migrate the container, the request comprising computational resource requirements for execution of the container, the computational resource requirements being determined by the real-time container management platform based on a continuous data feed received by the real-time container management platform from the first selected optimal machine;
      receive, from the machine-learning analysis platform and in response to a second optimal machine selection request sent based on the request to migrate the container, a second selected optimal machine; and
      migrate the container from the first selected optimal machine to the second selected optimal machine; and
   a third non-transitory computer-readable media storing instructions that, when executed by the machine-learning analysis platform comprising at least one processor, a communication interface, and at least one memory, cause the machine-learning analysis platform to:
      select the first selected optimal machine based on a plurality of cumulative models, wherein each cumulative model of the plurality of cumulative models is a combination of two different models associated with a different single computing device and predicts a computational availability of that different single computing device for a future time frame.

* * * * *